(12) United States Patent
Li et al.

(10) Patent No.: US 9,544,042 B2
(45) Date of Patent: Jan. 10, 2017

(54) OPPORTUNISTIC MOBILE RECEIVE DIVERSITY (OMRD) IN A DUAL-SIM DUAL-ACTIVE (DSDA) DEVICE

(71) Applicant: QUALCOMM Incorporated, San Diego, CA (US)

(72) Inventors: Wenjun Li, San Diego, CA (US); Jun Hu, San Diego, CA (US); Huang Lou, San Diego, CA (US); Vansh Pal Singh Makh, San Francisco, CA (US); Francis Ming-Meng Ngai, Louisville, CO (US); Ashish Gaonekar, Hyderabad (IN); Varsha Rao, San Diego, CA (US); Surekha Muralidharan, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 14/307,577

(22) Filed: Jun. 18, 2014

(65) Prior Publication Data

US 2015/0282057 A1    Oct. 1, 2015

Related U.S. Application Data

(60) Provisional application No. 61/973,001, filed on Mar. 31, 2014.

(51) Int. Cl.
*H04W 88/06* (2009.01)
*H04B 7/08* (2006.01)
(Continued)

(52) U.S. Cl.
CPC ............ *H04B 7/0871* (2013.01); *H04W 8/183* (2013.01); *H04W 8/22* (2013.01); *H04W 88/06* (2013.01)

(58) Field of Classification Search
None
See application file for complete search history.

(56) References Cited

U.S. PATENT DOCUMENTS 8,611,952 B2    12/2013    Clevorn et al.
2011/0217969 A1    9/2011    Spartz et al.
(Continued)

FOREIGN PATENT DOCUMENTS

EP      2515593 A2    10/2012
EP      2633628 A1    9/2013
(Continued)

OTHER PUBLICATIONS

International Search Report and Written Opinion—PCT/US2015/023442—ISA/EPO—Jul. 6, 2015.

*Primary Examiner* — Vladimir Magloire
*Assistant Examiner* — Frank Donado
(74) *Attorney, Agent, or Firm* — The Marbury Law Group, PLLC

(57) ABSTRACT

Methods and devices are disclosed for implementing opportunistic mobile receive diversity ("OMRD") on a multi-SIM wireless device. The wireless device may receive a request from a protocol stack associated with the first SIM to utilize the second RF resource for receive diversity, and determine whether a protocol stack associated with the second SIM currently has a lower priority than the protocol stack associated with the first SIM. Upon determining that the protocol stack associated with the second SIM currently has a lower priority than the protocol stack associated with the first SIM, the wireless device may grant control of the second RF resource to the protocol stack associated with the first SIM. Granting control may provide, to the protocol stack associated with the first SIM, a capability to enable and disable receive diversity using the first and second RF resources.

30 Claims, 15 Drawing Sheets

(51) Int. Cl.
  *H04W 8/18*  (2009.01)
  *H04W 8/22*  (2009.01)

(56) References Cited

U.S. PATENT DOCUMENTS

| | | |
|---|---|---|
| 2012/0264473 A1 | 10/2012 | Mujtaba et al. |
| 2013/0029720 A1* | 1/2013 | Clevorn ............... H04L 1/02 455/552.1 |
| 2013/0065644 A1* | 3/2013 | Bishop ............... H04W 8/183 455/558 |
| 2013/0072256 A1 | 3/2013 | Su |
| 2013/0201890 A1 | 8/2013 | Swaminathan et al. |
| 2013/0310035 A1* | 11/2013 | Gouriou ............ H04W 60/005 455/435.1 |
| 2014/0038601 A1* | 2/2014 | Gouriou ............. H04W 8/183 455/435.1 |
| 2014/0194157 A1* | 7/2014 | Ezekiel ............. H04W 76/025 455/552.1 |
| 2014/0228070 A1* | 8/2014 | Josso ................ H04W 68/00 455/552.1 |
| 2014/0364118 A1* | 12/2014 | Belghoul ............ H04W 4/003 455/435.1 |
| 2015/0099559 A1* | 4/2015 | Bendixen ............. H04B 1/38 455/552.1 |

FOREIGN PATENT DOCUMENTS

| | | |
|---|---|---|
| WO | 2013007869 A1 | 1/2013 |
| WO | 2013150171 A1 | 10/2013 |

\* cited by examiner

OPPORTUNISTIC MOBILE RECEIVE DIVERSITY (OMRD) IN A DUAL-SIM DUAL-ACTIVE (DSDA) DEVICE

RELATED APPLICATIONS

This application claims the benefit of priority to U.S. Provisional Application No. 61/973,001 entitled "Opportunistic Mobile Receive Diversity (OMRD) in a Dual-SIM Dual-Active (DSDA) Device" filed Mar. 31, 2014, the entire contents of which are hereby incorporated by reference.

BACKGROUND

Multi-subscriber identification module (SIM) wireless devices have become increasing popular because of the versatility that they provide, particularly in countries where there are many service providers. For example, dual-SIM wireless devices may allow a user to implement two different plans or service providers, with separate numbers and bills, on the same device (e.g., business account and personal account). Also, during travel, users can obtain local SIM cards and pay local call rates in the destination country. By using multiple SIMs, a user may take advantage of different pricing plans and save on mobile data usage.

In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc. One type of multi-SIM wireless device, referred to as a dual-SIM dual active (DSDA) device, allows simultaneous active connections with the networks corresponding to two SIMs using separate transmit/receive chains associated with each SIM.

In a DSDA device, each SIM may be associated with a separate radio frequency (RF) resource, thereby allowing the DSDA device to simultaneously connect to and communicate on both networks. However, when one subscription is inactive, the DSDA device may not be using its RF capabilities to the fullest potential.

In some DSDA devices, information stored on a SIM of a DSDA device may enable use of advanced wireless communications interface technologies. While such advanced technologies may provide increased speed to improve various user experiences (e.g., high data rates, streaming high-bandwidth media, complex applications, etc.), they may also require increased capacity on the receiver of the wireless device.

Some DSDA devices may therefore benefit from the use of multiple antennas and/or other RF receive chain components, i.e., as "receive diversity." Specifically, in some DSDA devices, receive diversity may provide dramatic improvement in data throughput, and may prevent dropped calls in weak coverage areas. However, in order to enable receive diversity for a SIM in a conventional DSDA device, dual antenna support is required on the RF resource associated with that SIM, which may add hardware costs to the device. Further, during times in which the benefits of receive diversity may be unneeded or underutilized, the added power cost and delays associated with implementing receive diversity may not be warranted.

SUMMARY

Systems, methods, and devices of various embodiments enable a multi-SIM wireless communication device to implement opportunistic mobile receive diversity ("OMRD") by receiving a request from a protocol stack associated with a first SIM and a first RF resource to utilize a second RF resource that is associated with a second SIM to provide receive diversity, determining whether a protocol stack associated with the second SIM currently has a lower priority than the protocol stack associated with the first SIM, and granting control of the second RF resource to the protocol stack associated with the first SIM in response to determining that the protocol stack associated with the second SIM currently has a lower priority than the protocol stack associated with the first SIM. In some embodiment methods and devices, granting control of the second RF resource may include providing, to the protocol stack associated with the first SIM, a capability to enable and disable receive diversity using the first and second RF resources.

In some embodiment methods and devices, determining whether a protocol stack associated with the second SIM currently has a lower priority than the protocol stack associated with the first SIM may include determining whether the second SIM protocol stack is currently in idle mode, and determining whether a sleep period of an idle mode power-saving cycle supported by the second SIM is longer than a predetermined minimum duration. In some embodiment methods and devices, the predetermined minimum duration is configured to provide sufficient time for the protocol stack associated with the first SIM to disable receive diversity and release control of the second RF resource.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
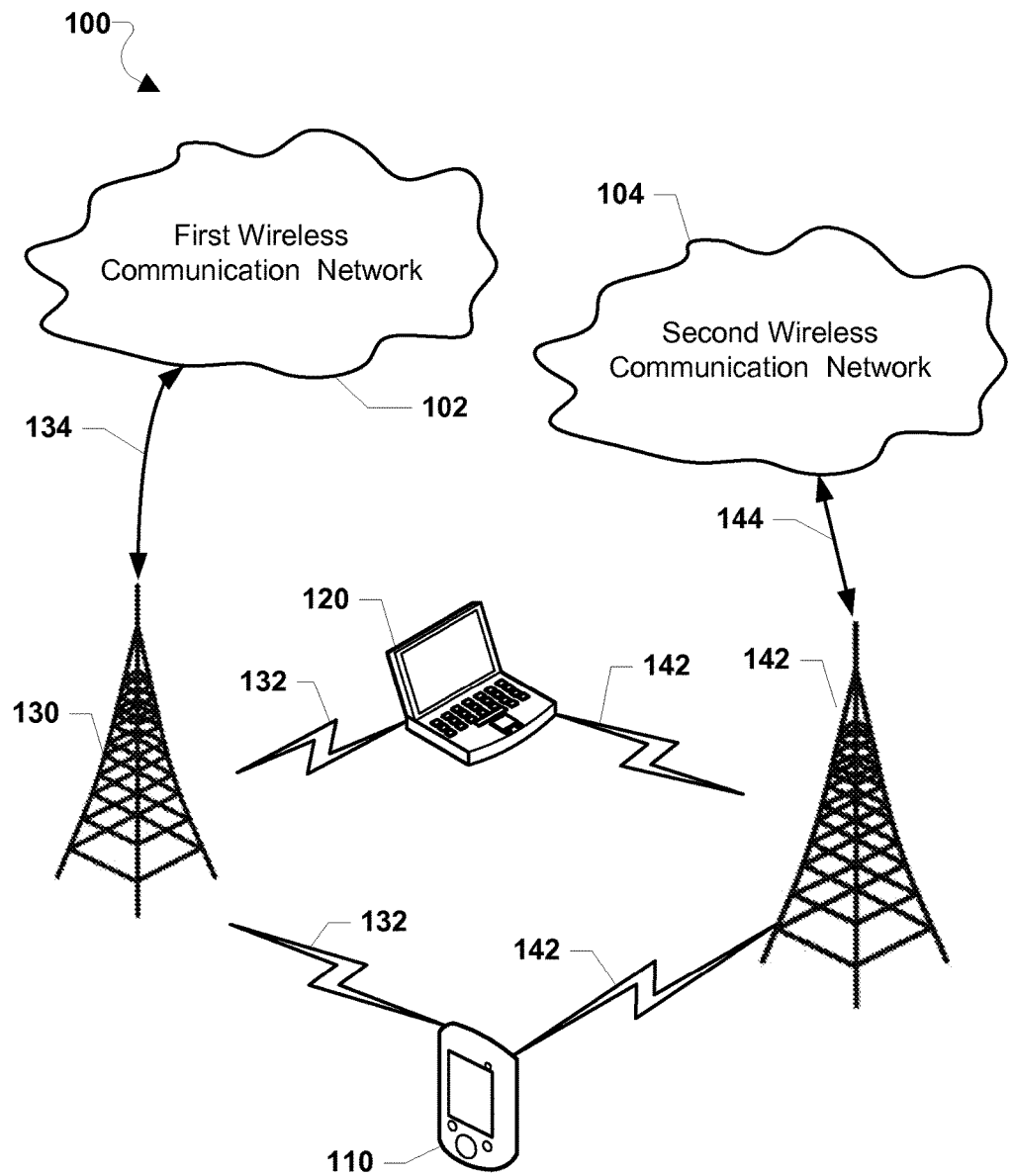
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In various embodiments, certain technologies may gain use of an additional RF resource that is not being used, thereby providing receive diversity. Receive diversity may be opportunistically applied based on a diversity scheme implemented through a transceiver resource manager (TRM) module. In particular, the diversity scheme in various embodiments may involve determining, by the TRM module, whether to permit a protocol stack associated with a particular SIM to utilize, in addition to its own RF resource, an additional RF resource associated with a different SIM in normal operation. This determination may be made based on information about current radio/mobility modes on one or more of the protocol stacks, the radio access technologies being used, device capabilities, current and future signal scheduling, transmission requirements, user settings, among other criteria.

The terms "wireless device," "mobile device," and "wireless communications device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways enabled by two or more SIMs.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM. For example, references to assigning an RF resource to a SIM (or granting a SIM radio access) means that the RF resource has been allocated to establishing or using a communication service with a particular network that is enabled by the information stored in that SIM.

As used herein, the terms "multi-SIM wireless communication device," "multi-SIM wireless device," "dual-SIM wireless communication device," "dual-SIM dual active device," and "DSDA device" are used interchangeably to describe a wireless device that is configured with more than one SIM and is capable of independently handling communications with networks of two or more subscriptions.

As used herein, the terms "wireless network," "cellular network," and "cellular wireless communication network" are used interchangeably to refer to a portion or all of a wireless network of a carrier associated with a wireless device and/or subscription on a wireless device.

As used herein, the terms "diversity," "receive diversity," "diversity reception," and "receiver diversity" are used interchangeably to refer to processing a downlink/forward link signal by input to multiple receive chains in a wireless communications device. For example, at least two antennas provide at least two different inputs signals to a receiver, each of which has a different multi-path.

As used herein, the terms "power-saving cycle," "power-saving mode," "discontinuous reception," and "DRX cycle" are used interchangeably to refer to an idle mode process that involves alternating sleep periods (during which power consumption is minimized) and awake (or "wake-up") periods in which normal power consumption and reception are returned, and the wireless device monitors a channel by normal reception. The length of a power-saving cycle or DRX cycle, measured as the interval between the start of an awake period and the start of the next awake period, is typically signaled by the network.

Wireless communication networks are widely deployed to provide various communication services such as voice, packet data, broadcast, messaging, and so on. These wireless networks may be capable of supporting communications for multiple users by sharing the available network resources. Examples of such wireless networks include the Global System for Mobile Communications (GSM), Code Division Multiple Access (CDMA) networks, Time Division Multiple Access (TDMA) networks, and Frequency Division Multiple Access (FDMA) networks. Wireless networks may also utilize various radio technologies such as Wideband-CDMA (W-CDMA), cdma2000, Global System for Mobile Communications (GSM), etc. While reference may be made to procedures set forth in GSM standards such references are provided merely as examples, and the claims encompass other types of cellular telecommunication networks and technologies.

Modern mobile communication devices (e.g., smartphones) may now each include a plurality of SIM cards that enable a user to connect to different mobile networks while using the same mobile communication device. Each SIM card serves to identify and authenticate a subscriber using a particular mobile communication device, and each SIM card is associated with only one subscription. For example, a SIM card may be associated with a subscription to one of GSM, TD-SCDMA, CDMA2000, and WCDMA. With a DSDA device, a user may maintain two subscriptions because the mobile communication device has two SIM cards. These subscriptions may have their own radio frequency (RF) transceiver and may, therefore, simultaneously connect to each of their respective mobile network.

Controlling receive diversity may be applicable to any of a number of wireless communication system, using various multiple access schemes, such as, but not limited to, Code Division-Multiple Access (CDMA), Frequency Division-Multiple Access (FDMA), Orthogonal Frequency Division Multiplexing (OFRDM) or Time Division-Multiple Access (TDMA). Examples of CDMA multiple access schemes include but are not limited to TIA/EIA/IS-95, TIA/EIA/IS-2000 or CDMA2000, 1xEV-DO, 1xEV-DV, 802.11a, 802.11b, 802.11g, 802.11n, 802.11ac, WIMAX, and WCDMA. Embodiments described herein may also extend to Long Term Evolution (LTE) wireless communication systems, thereby extending OMRD operations to opportunistic multiple-input multiple-output (MIMO). The embodiments described herein may be used in any wireless system having two or more antennas coupled to two or more receivers.

While specific embodiments may be described herein with reference to a degree of diversity of two (i.e., two RF resources, two antennas, two RF receive chains, etc.), such references are used as example and are not meant to preclude embodiments using three or more RF resources to provide receive diversity. The term "receiver" may indicate an RF receive chain and/or portions of the RF receive chain in use for receive operations, whether or not receive diversity is used at the time. Such portions of the RF receive chain may include, without limitation, an RF front end, components of the RF front end (including a receiver unit), antennas, etc. Portions of the RF receive chain may be integrated into a single chip, or distributed over multiple chips. Also, the receiver, the receiver chain, or portions of the receiver chain may be integrated into a chip along with other functions of the wireless device. The embodiments described herein may be used in wireless systems having two or more antennas coupled to two or more receive components (i.e., one receiver plus one or more diversity receivers, in the wireless communication device for a given communication scheme).

The various embodiments may be implemented within a variety of communication systems, an example of which is illustrated in FIG. 1. Wireless communication system 100 may include at least two communication networks, such as a first wireless communication network 102 and a second wireless communication network 104. In various embodiments, the wireless communication networks 102, 104 may be typical radio access networks that include a plurality of cellular base stations 130 and 140. A first wireless communication device 110 may be in communication with the first wireless communication network 102 through a cellular connection 142 to a first base station 140. The first wireless communication device 110 may also be in communication with the second wireless communication network 104 through a cellular connection 132 to a second base station 130. A second wireless communication device 120 may similarly communicate with the first mobile network 102 through a cellular connection 142 to a first base station 140. The second wireless communication device 120 may communicate with the second wireless communication network 104 through a cellular connection 132 to the second base station 130. The cellular connections 132 and 142 may be made through two-way wireless communication links, such as 4G, 3G, CDMA, TDMA, and other mobile telephony communication technologies.

Figure 2:
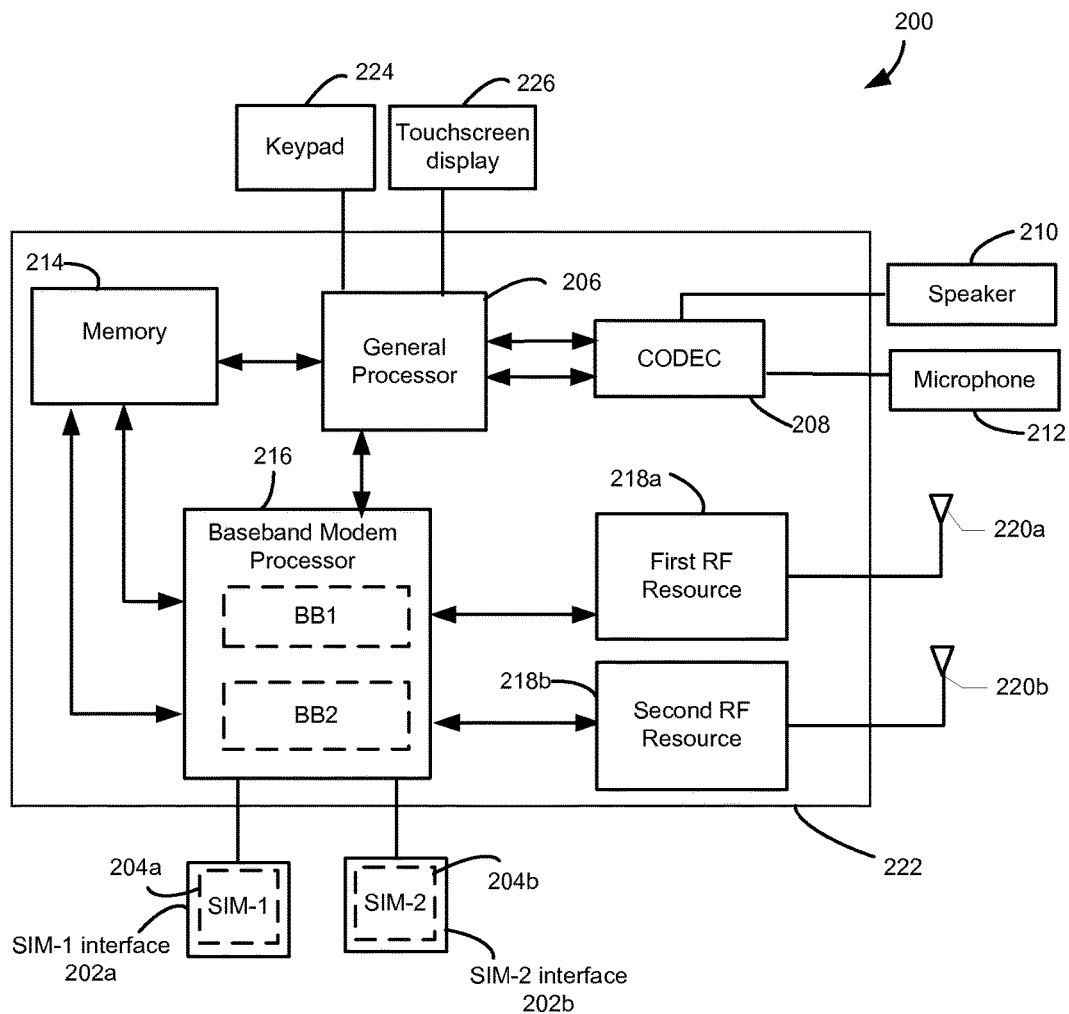
FIG. 2 is a block diagram illustrating a dual-SIM dual active wireless communications device according to an embodiment.

FIG. 2 is a functional block diagram of an example DSDA multi-SIM wireless device 200 that is suitable for implementing various embodiments. The wireless device 200 may be similar to one or more of the wireless devices 110, 120, described above with reference to FIG. 1. With reference to FIGS. 1-2, the wireless device 200 may include a first SIM interface 202a, which may receive a first identity module SIM 204a that is associated with the first subscription. The wireless device 200 may also include a second SIM interface 202b, which may receive a second identity module SIM 204b that is associated with the second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204a, 204b may have a CPU, ROM, RAM, EEPROM and I/O circuits. A SIM 204a, 204b used in various embodiments may contain user account information, an IMSI a set of SIM application toolkit (SAT) commands and storage space for phone book contacts. A SIM 204a, 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on the SIM card for identification.

The wireless device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions.

The general purpose processor 206 and memory 214 may each be coupled to at least one baseband modem processor 216. Each SIM 204a, 204b in the wireless device 200 may be associated with a baseband-RF resource chain that includes a baseband modem processor 216 and an RF resource (i.e., RF front end) 218a, 218b. In various embodiments, baseband-RF resource chains may include physically or logically separate baseband modem processors (e.g., BB1, BB2).

The RF resources 218a, 218b may be coupled to an antennas 220, 221, and may perform transmit/receive functions for the wireless services associated with each SIM 204a, 204b of the wireless device 200. In some embodiments, the RF resources 218a, 218b may be coupled to wireless antennas 220a, 220b for sending and receiving RF signals for the SIMs 204a, 204b thereby enabling the wireless device 200 to perform simultaneous communications with separate networks and/or service associated with the SIMs 204a, 204b. The first and second RF resources 218a, 218b may provide separate transmit and receive functionality, or may include a transceiver that combines transmitter and receiver functions.

In particular embodiments, the general purpose processor 206, memory 214, baseband modem processor(s) 216, and RF resources 218a, 218b may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

In this manner, in a DSDA wireless device, such as the wireless device 200, each RF resource associated with a SIM and its corresponding modem stack may operate as an independent device, despite being co-located and sharing non-network based resources with one another (e.g., user input/output resources, general processor and storage, etc.). While such independent functionality provides multiple user benefits, such as providing the user with essentially multiple different phones in the same physical housing, in some scenarios a wireless device may benefit from opportunistically allocating use of an RF resource, such as to provide receive diversity capability to a protocol stack associated with a particular SIM.

Figure 3A:
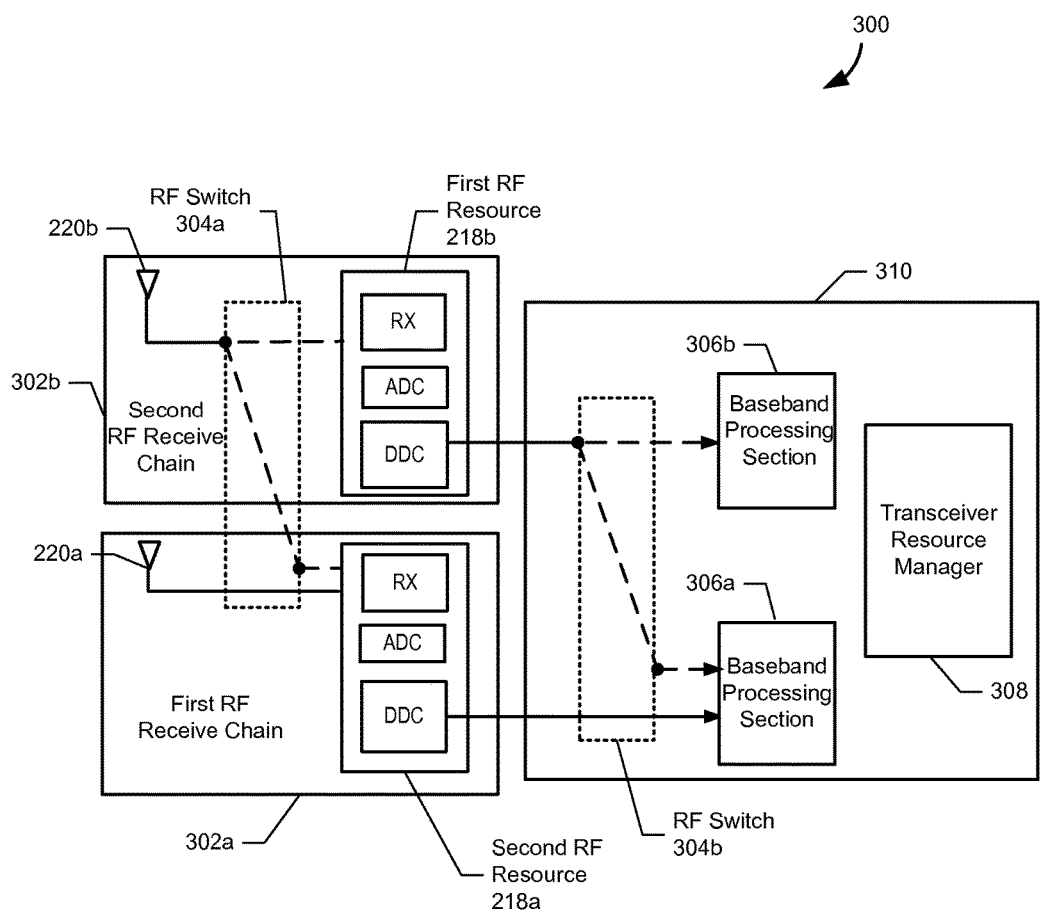
FIGS. 3A-3C are block diagrams illustrating example configurations of elements that are associated with implementing opportunistic mobile receive diversity (OMRD) on a multi-SIM wireless communication device according to various embodiments.

FIG. 3A illustrates a configuration 300 of receive elements that may interact in a wireless device to provide OMRD capability according to various embodiments. Referring to FIGS. 1 and 2, such receive elements may be functions and/or components of the wireless device 200. With reference to FIGS. 1-3A, in the configuration 300, a first RF receive chain 302a may include the first antenna 220a and the first RF resource/front end 218a. Components of the first RF resource 218a may include, but are not limited to, a receiver unit, an analog to digital converter (ADC), and a digital down converter (DDC), the functions and details of which are known in the art of digital transceiver design. Similarly, a second RF receive chain 302b may include the second antenna 220b and the second RF resource/front end 218b. Components of the second RF resource 218b may also include, but are not limited to, a receiver unit, a second analog to digital converter (ADC), and a digital down converter (DDC). During operation in the various embodiments, the first and second RF receive chains 302a, 302b may be adapted to receive RF signals from first and second networks (e.g., 102, 104), respectively.

Baseband processing sections 306a, 306b may represent functions of the baseband modem processor 216 associated with the first and second RF receive chains 302a, 302b, respectively. The baseband processing sections 306a, 306b in various embodiments manage radio control functions that may include transmit functions, as well as additional receive functions, neither of which are shown. For example, transmit functions may include encoding, interleaving, and multiplexing at the symbol rate, and channelization, spreading, and modulation at the chip rate. The additional receive functions may include rake receiving, and symbol combining, and finger control at the chip rate, and demultiplexing, deinterleaving, and decoding at the symbol rate. A variety of other receive functions that are not shown may nevertheless be included in the first and second RF receive chains 302a, 302b, as will be understood by those of skill in the art.

The various embodiments may include an RF switch or switches 304a, 304b implemented according to any of a number of suitable configurations. By changing the state of an RF switch, such as RF switches 304a or 304b, the path for signals received on each antenna 220a, 220b, or by each RF resource 218a, 218b, may be controlled. In particular, control of the RF switch 304a or 304b may be performed by a transceiver resource manager (TRM) module 308. Receive diversity may be enabled when the received signal input to the second RF receive chain 302b is configured to operate in conjunction with components providing signaling for the first SIM 204a (e.g., baseband processing section 306a). This configuration may be the result of the RF switch 304a or RF switch 304b, depending on the design of the radio components.

Figure 3B:
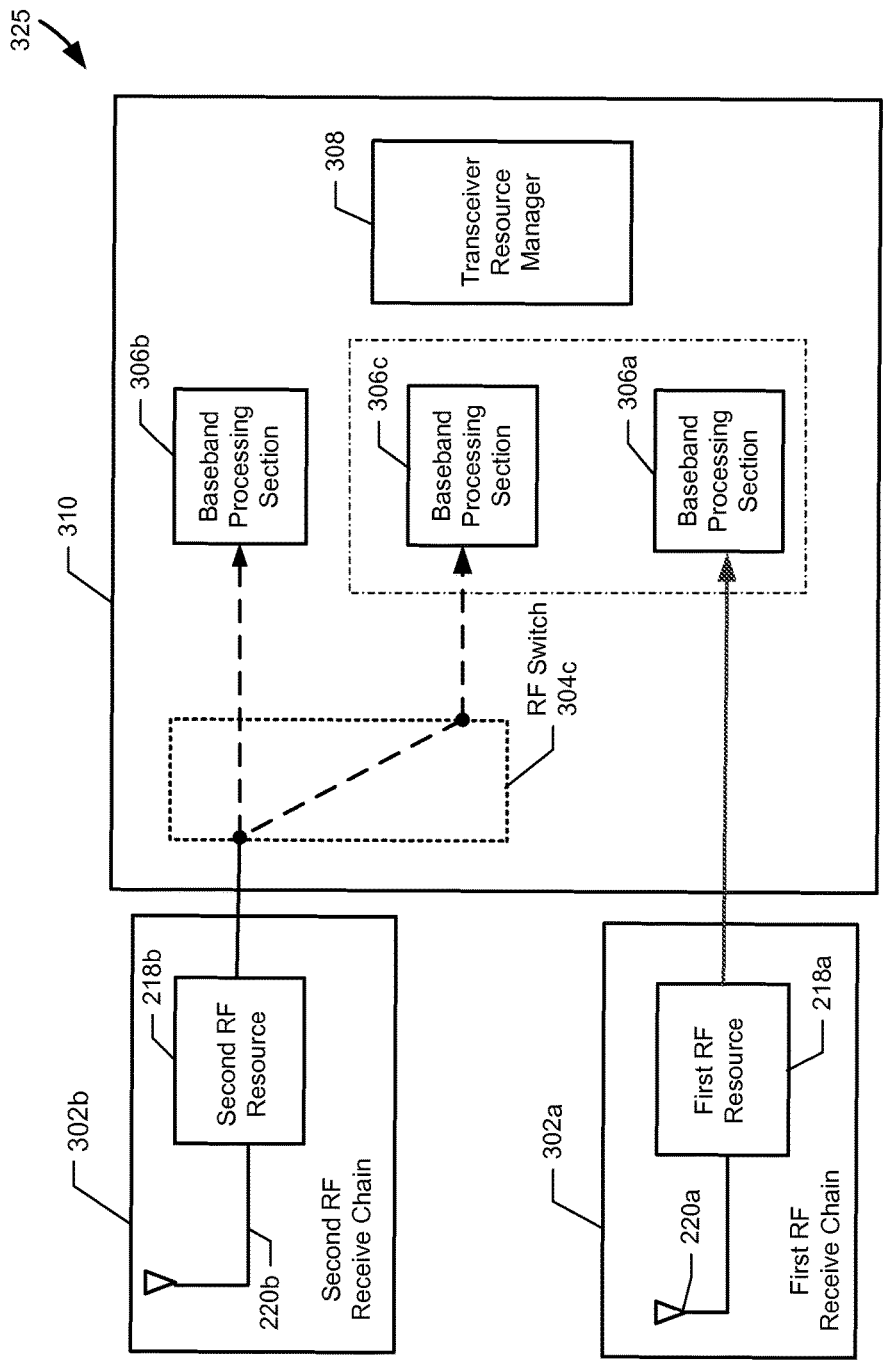

Variations in the first RF receive chain 302a and second RF receive chain 302b may exist depending on the design of the wireless device 200. Those of ordinary skill in the art will recognize that in the various embodiments, the switch configurations may be applied with any numbers of antennas, RF receive chains, etc. For example, FIG. 3B illustrates another configuration 325 of receive elements that may interact in a wireless device to provide OMRD capability according to various embodiments. Referring to FIGS. 1-3B, such receive elements may be functions and/or components of the wireless device 200. With reference to FIGS. 1-3B, in the configuration 325, the first RF receive chain 302a may include the first antenna 220a and the first RF resource/front end 218a. Similarly, a second RF receive chain 302b may include the second antenna 220b and the second RF resource/front end 218b. The first and second RF receive chains 302a, 302b may be implemented by separate wireless transceivers. As also discussed (e.g., with reference to FIG. 3A), components of each of the first and second RF resources 218a, 218b may include, but are not limited to, a receiver unit, an ADC, and a DDC (not shown). During operation in the various embodiments, the first and second RF receive chains 302a, 302b may be adapted to receive RF signals from at least first and second networks, respectively.

In various embodiments, a baseband processing section 306a may represent functions of the baseband modem processor 216 associated with the first RF receive chain 302a, while other baseband processing sections 306b, 306c may represent functions of the baseband modem processor 216 associated with the second RF receive chain 302b. Further, in some embodiments, baseband processing sections 306b, 306c may be associated with different protocols or radio access technologies that are enabled by the same SIM, such as a SIM that enables communication on both GSM/UMTS networks and Long Term Evolution (LTE) networks. In some embodiments, the baseband processing sections 306b, 306c may be associated with different SIMs that enable communication using different protocol or radio access technology. An RF switch 304c may be implemented as part of the configuration 325, and may be controlled by the TRM module 308 in order to change the path for signals processed by the second RF receive chain 302b. Receive diversity may be enabled when the signal processed by the second RF receive chain 302b is configured to operate in conjunction with components providing signaling for the baseband processing section 306c, as a result of an inter-receive chain state change by the RF switch 304c.

Figure 3C:
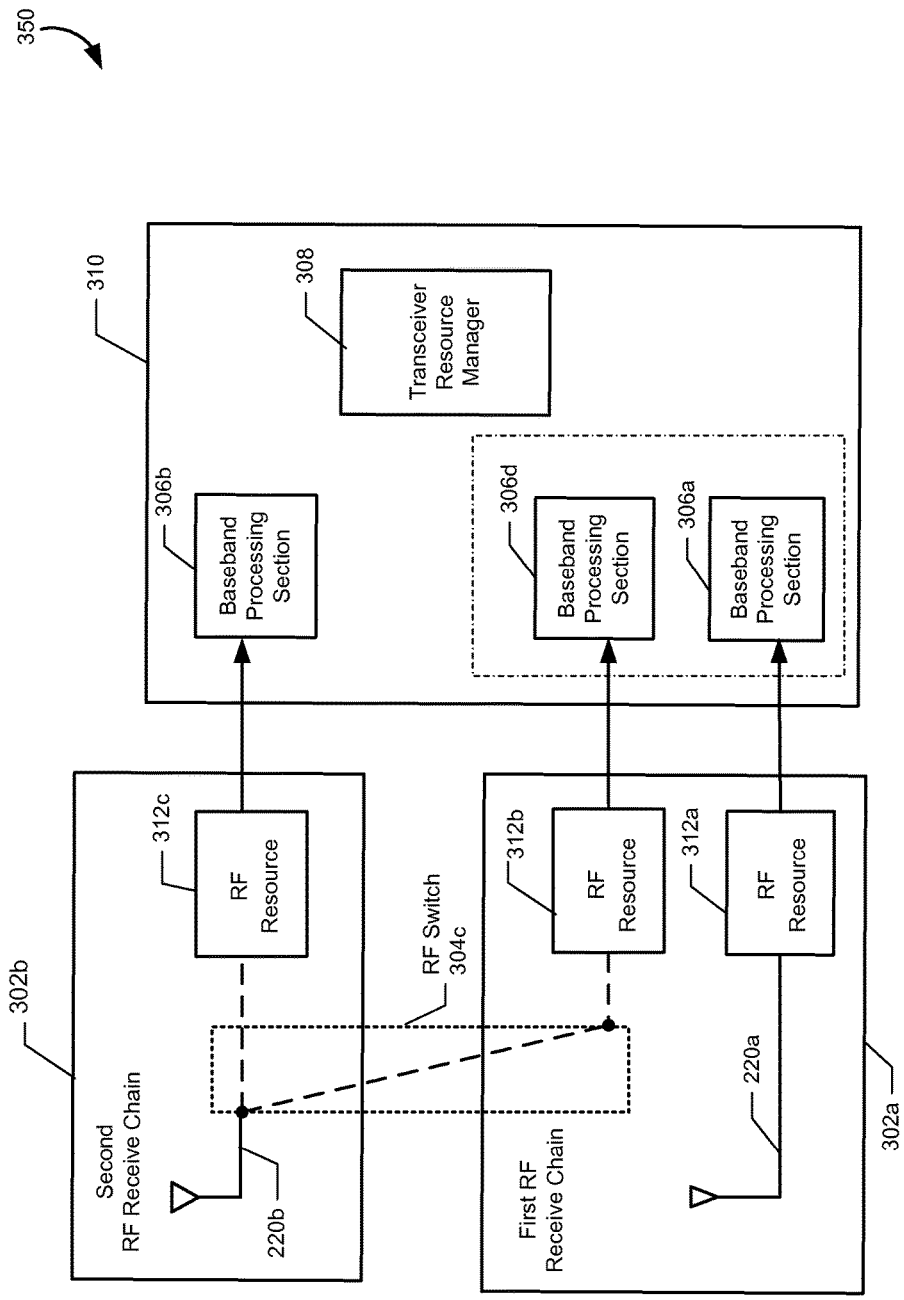

FIG. 3C illustrates another configuration 350 of receive elements that may interact in a wireless device to provide OMRD capability according to various embodiments. Referring to FIGS. 1-3C, such receive elements may be functions and/or components of the wireless device 200. With reference to FIGS. 1-3C, in the configuration 350, the first RF receive chain 302a may include the first antenna 220a and RF resources/front ends 312a and 312b. Similarly, a second RF receive chain 302b may include the second antenna 220b and an RF resource 312c. The first and second RF receive chains 302a, 302b may be implemented by separate wireless transceivers. Similar to the RF resources 218a, 218b and/or 218c (e.g., discussed with reference to FIGS. 3A and 3B), components of each of the RF resources 312a, 312b, 312c may include, but are not limited to, a receiver unit, an ADC, and a DDC (not shown). During operation in the various embodiments, the first and second RF receive chains 302a, 302b may be adapted to receive RF signals from at least first and second networks, respectively.

In various embodiments, baseband processing sections 306a, 306d may represent functions of the baseband modem processor 216 associated respectively with RF resources 312a, 312b of the first RF receive chain 302a, and the baseband processing section 306b may represent functions of the baseband modem processor 216 associated with the second RF chain 302b. In some embodiments, the baseband processing sections 306b, 306d may be associated with different protocols or radio access technologies that are enabled by the same SIM. In other embodiments, the baseband processing sections 306b, 306d may be associated with different SIMs that enable communication using different protocol or radio access technology.

An RF switch 304d may be implemented as part of the configuration 350, and may be controlled by the TRM module 308 in order to change the path for signals processed by the second RF receive chain 302b. Receive diversity may be enabled when the signal received by the second antenna 220b of the second RF receive chain 302b is configured to operate in conjunction with components providing signaling for the RF resource 312b of the first RF receive chain 302a. Such receive diversity may be the result of an intra-receive chain state change by the RF switch 304c, which switches signals received by the second antenna 220b from receive components of the second RF receive chain 302b to the first RF receive chain 302a.

Moreover, while the baseband processing sections 306a, 306b, and/or 306c and the TRM module 308 may be discrete components, they may be integrated in a number of ways, either with one another or with other components of the wireless device 200. In particular embodiments, some components, such as the baseband processing sections 306a, 306b, and/or 306c and the TRM module 308 may be included in a system-on-chip device 310.

Separate units of the baseband-modem processor 216 of the wireless device 200 may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

Receiver diversity may be particularly beneficial when implemented for certain wireless communication protocols. For example, for high bit rates provided by HSDPA in a WCDMA network, receive diversity may reduce base station power requirements because less power needs to be transmitted to maintain a high-quality link between the base station and the handset. That is, the likelihood of the base station having to transmit more power to contend with poor signal quality may be reduced, allowing the decoder in the baseband processor to perform better. As a result, quality of service (QoS) may be improved throughout the entire cell and a boost in data rates compared to single-antenna designs may be achieved.

Figure 4:
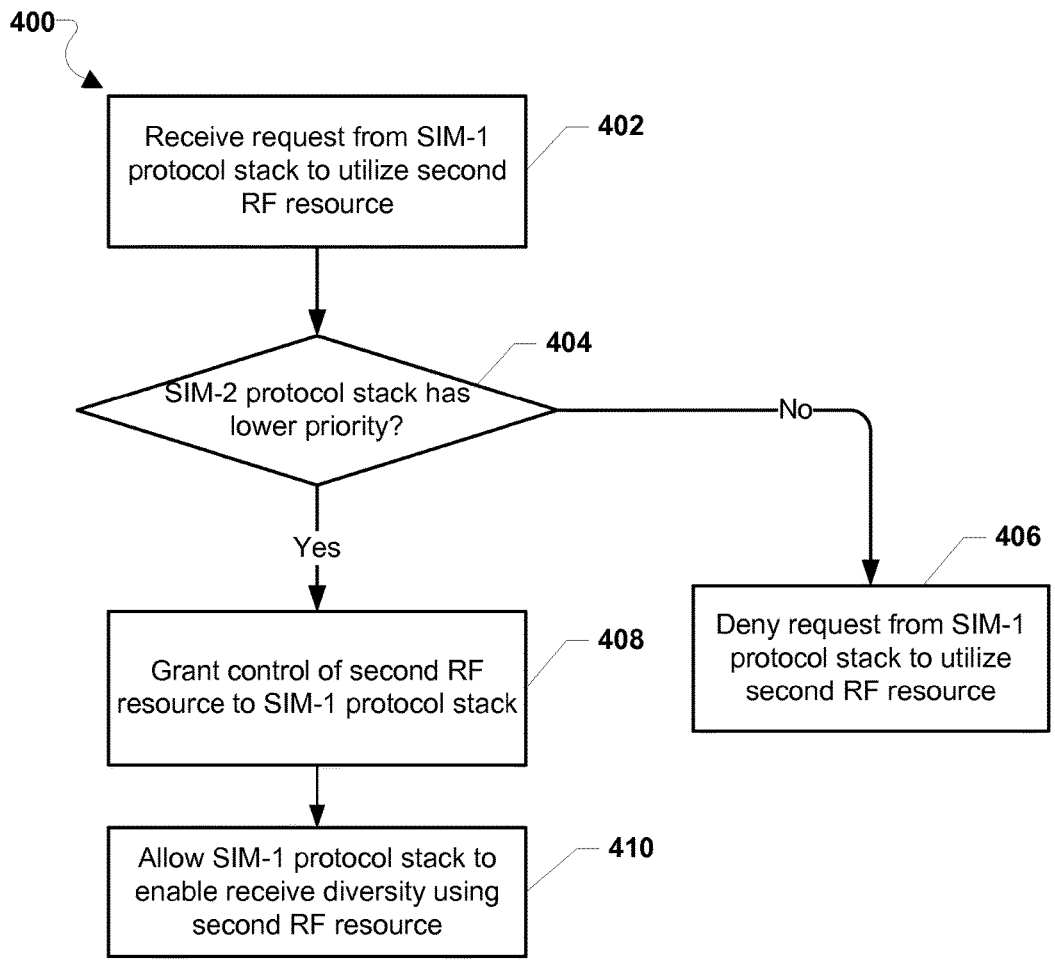
FIG. 4 is a process flow diagram illustrating a method for implementing OMRD in an example dual-SIM wireless communication device according to various embodiments.

FIG. 4 illustrates an embodiment method 400 of managing RF resource arbitration on a wireless device, such as a DSDA device. With reference to FIGS. 1-4, the operations of the method 400 may be implemented in the TRM module 308 by one or more processors of the wireless device 200, such as the general purpose processor 206 and/or baseband modem processor(s) 216, or a separate controller (not shown) that may be coupled to the memory 214 and to the baseband modem processor(s) 216.

While the various embodiments describe the TRM processes as performing arbitration among two SIMs for use of one RF resource, the various embodiment TRM processes may be implemented to manage various combinations of more than two RF resources and/or SIMs. For example, the TRM module may be configured to arbitrate use of two RF resources between three different SIMs, of three RF resources between four different SIMs, etc. In various embodiments, the TRM module may output control signals to the protocol stacks associated with the first and second SIMs and/or to receiver units of the first and second RF resources.

The references to the first SIM (SIM-1) and RF resource, and the second SIM (SIM-2) and RF resource are arbitrary and used merely for the purposes of describing the embodiments, and the wireless device processor may assign any indicator, name or other designation to differentiate the SIMs and associated protocol stacks and RF resources. Further, embodiment methods apply the same regardless of which SIM is benefiting from receive diversity. For example, in one call the second RF resource may be made available to enable receive diversity for a call on a service associated with the first SIM, while in the next call, the first RF resource may be made available to enable receive diversity for a call on a service associated with the second SIM. While RF resource arbitration depends on the particular radio access technologies associated with each SIM and rules configured to be implemented by the TRM module, a general arbitration management process may proceed according to method 400.

In block 402, the wireless device processor may receive a request from a protocol stack associated with a first SIM ("SIM-1") to utilize an RF resource that is normally associated with a second SIM ("second RF resource"). Such request may be passed to the wireless device processor by the first SIM protocol stack in response to various conditions. For example, the first SIM protocol stack may have determined, due to degraded signal strength and/or other measures relating to use of an RF resource associated with the first SIM ("first RF resource"), that an ongoing communication on a network supported by the first SIM would benefit from receive diversity. In another example, the protocol stack for the first SIM may be configured to automatically request use of the second RF resource to implement receive diversity regardless of the communication status of the first SIM protocol stack.

In determination block 404, the wireless device processor may compare the statuses of protocol stacks associated with the first SIM and second SIM ("SIM-2") to determine whether the second SIM protocol stack currently holds a lower priority than the protocol stack associated with the first SIM. In various embodiments, such determinations may be performed in a number of different ways depending on the specific radio access technologies and diversity schemes (e.g., as discussed in further detail below with respect to FIGS. 5A, 5B, and 7A-7E). For example, the relative priorities of the protocol stacks associated with the first and second SIMs may be based on the current mode of both or all protocol stacks, or may be based on the current mode of only one protocol stack.

In some embodiments, the wireless device processor may be configured to always give priority to a particular SIM if that SIM is in a dedicated or traffic mode (i.e., involved in active data transmission). In another example, the wireless device processor may be configured to only give priority to a particular SIM if the other SIM is in an idle mode, or is in a radio-off condition.

In response to determining that the protocol stack associated with the second SIM does not have a lower priority than the protocol stack associated with the first SIM (i.e., determination block 404="No"), the TRM module (or the processor executing the TRM module) may deny the request to utilize the RF resource associated with the first SIM in block 406. In response to determining that the protocol stack associated with the second SIM is at a lower priority than that of the protocol stack associated with the first SIM (i.e., determination block 404="Yes"), the TRM module (or the processor executing the TRM module) may grant the request to utilize the RF resource associated with the first SIM in block 408. In block 410 the wireless device processor may allow the protocol stack associated with the first SIM to enable receive diversity using the second RF resource.

Figure 5A:
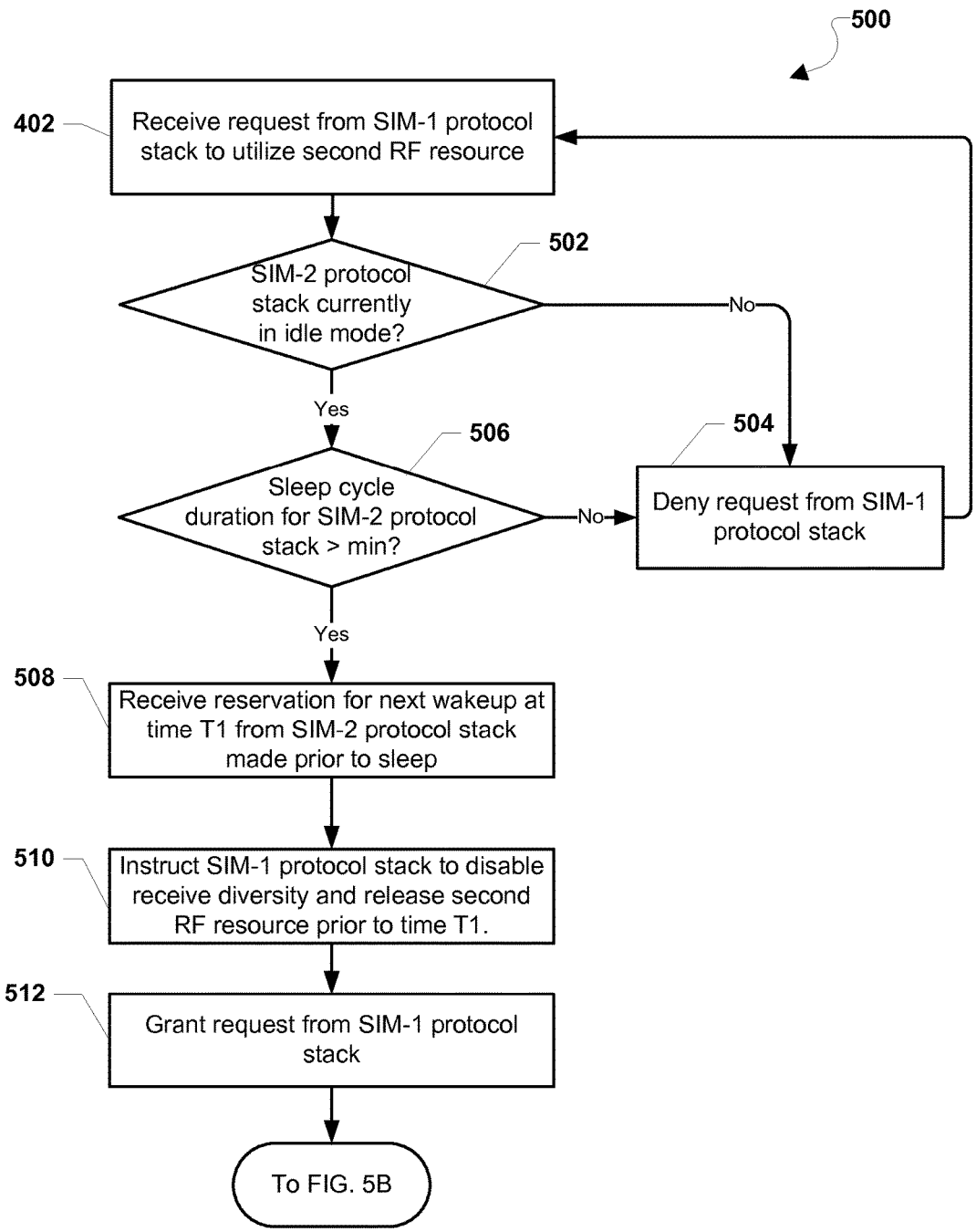
FIGS. 5A and 5B are process flow diagrams illustrating another method for implementing OMRD in an example dual-SIM wireless communication device according to various embodiments.
Figure 5B:
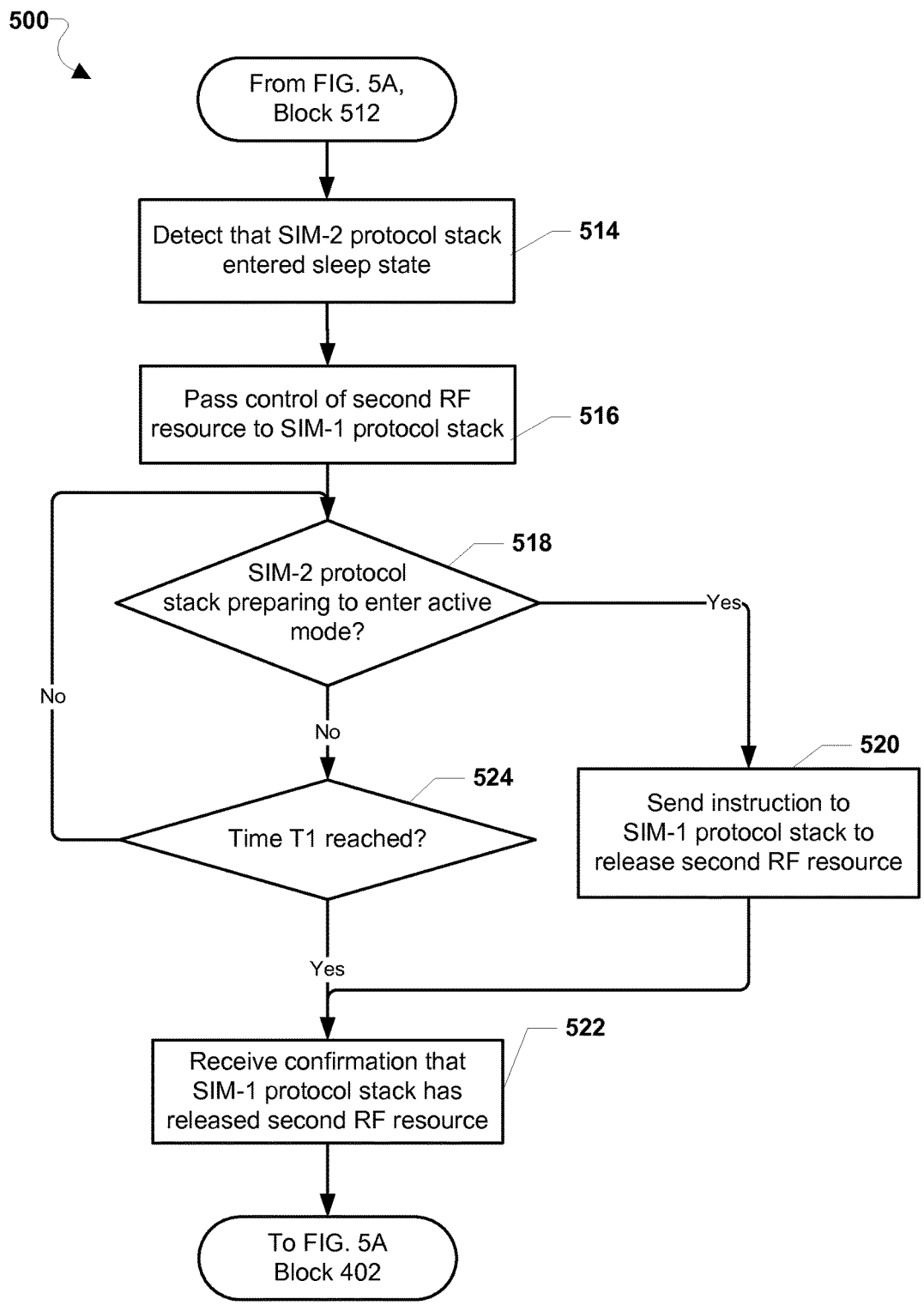

As discussed, management of RF resources by the TRM module (or the processor executing the TRM module) may be based on the particular radio access technologies enabled by each SIM and the rules (i.e., diversity scheme) with which the TRM processes are configured. FIGS. 5A and 5B illustrate an embodiment method 500 that may be implemented in a wireless device (e.g., the wireless device 200 in FIG. 2), such as a DSDA device, configured with a first SIM that supports a high-speed radio access standard (e.g., WCDMA), and with a second SIM that supports a second generation ("2G") radio access standard (e.g., GSM). While described with reference to WCDMA and/or GSM networks, the embodiments shown in FIGS. 5A and 5B may be implemented for any of a number of radio access technologies.

With reference to FIGS. 1-5A, method 500 may begin with block 402, as described with respect to the method 400. In determination block 502, the wireless device processor may determine whether the protocol stack associated with the second SIM is currently in idle mode in its respective network (e.g., a GSM network). In response to determining that the protocol stack associated with the second SIM is not currently in idle mode in its network (e.g., determination block 502="No"), the wireless device processor may deny the request from the protocol stack associated with the first SIM in block 504. In various embodiments, the first SIM protocol stack may be configured to automatically re-request use of the RF resource associated with the second SIM following each loss of OMRD capability and/or each denial of a request to use that RF resource. Therefore, the wireless device processor may return to block 402 to repeat the operations involved in receiving such request.

In response to determining that the protocol stack and RF resource associated with the second SIM are in idle mode (i.e., determination block 502="Yes"), the wireless device processor may determine whether a sleep period associated with the second SIM protocol stack has a longer duration than a minimum threshold time in determination block 506. In various embodiments, while in idle mode the protocol stack associated with the second SIM may enter a power-saving cycle that includes periods of sleep and awake states (e.g., discontinuous reception (DRX)). The length of the sleep period may be preconfigured by the service provider in settings associated with the second SIM, which may be accessed by the wireless device processor. In some embodiments, the sleep period length may be accessed by querying a known source of information maintained by a service provider or system associated with the radio access technology.

A modem stack in such a power-saving mode may monitor paging channels/receive network pages (i.e., radio use) during the awake period, and be out-of-service (i.e., no radio use) during the sleep period.

Since there is a time and power requirement associated with OMRD setup and teardown, in various embodiments, the second SIM protocol stack may be configured to only enter its power save mode sleep state (and thereby surrender use of its RF resource) if the sleep state duration (i.e., time until the next wakeup on the second SIM) will provide enough time to tear down an OMRD connection associated with the first SIM protocol stack. In an example, the minimum threshold associated with the second SIM may be 10 frames (e.g., 46.15 ms for GSM). Such a minimum threshold time may be set by the network provider associated with the second SIM and/or may be determined by querying the second SIM protocol stack, directly accessing non-volatile memory associated with the second SIM, accessing a separate data storage on the wireless device, etc.

In response to determining that the sleep cycle associated with the second protocol stack is not longer than the minimum threshold time (i.e., determination block 506="No"), the wireless device processor may return to block 504 and deny the request from the first protocol stack, after which the wireless device processor may return to block 402 to repeat the steps involved in receiving such request.

In response to determining that the sleep cycle associated with the second protocol stack is longer than the minimum threshold time (i.e., determination block 506="Yes"), in block 508 the wireless device processor may receive, from the second protocol stack, a reservation for the next wakeup time (i.e., at time "T1"). That is, prior to entering the sleep period of each power-saving cycle (e.g., DRX cycle), the second SIM protocol stack may identify the next point at which the second RF resource will exit the sleep state and begin reading/decoding a paging channel of the network associated with the second SIM.

In block 510, the wireless device processor may pass an instruction notifying the first SIM protocol stack that it will need to end OMRD capability (disable receive diversity) and release control of the second RF resource by time T1. In block 512, the wireless device processor may grant the request from the first SIM protocol stack to utilize the second RF resource, and the wireless device processor may proceed to execute operations of the method 500 illustrated in FIG. 5B.

Referring to FIGS. 1-5B, in block 514, the wireless device processor may detect when the second SIM protocol stack enters the sleep period of its power-saving mode cycle (e.g., by monitoring power usage, receiving a message, etc.). In block 516, the wireless device processor may pass control of the second RF resource to the first SIM protocol stack, thereby providing receive diversity capability to the first SIM protocol stack.

In determination block 518, the wireless device processor may determine whether the wireless device is preparing to enter an active mode on the second SIM. For example, a user input requesting a mobile originating call on the network of the second SIM received by the wireless device processor will inform the processor that the second SIM is about to be engaged in an active call. Since entering an active mode requires transmitting information to the network (e.g., a request on the random access channel (RACH) for a signaling channel), the wireless device processor may be configured to recognize such transmissions (or the preparations to make such transmissions) as preparing to enter an active mode on the second SIM (e.g., dedicated mode for a circuit-switched call). In another example, an application running on the wireless device may execute operations to initiate a data communication session that the wireless device processor may recognize as preparing to enter an active mode on the second SIM (e.g., switching to a ready state for packet-switched communication).

In response to determining that the wireless device is preparing to enter an active mode on the second SIM (i.e., determination block 518="Yes"), the wireless device processor may send an instruction to the first SIM protocol stack to release control of the second RF resource in block 520. In response, the first SIM protocol stack may disable OMRD and release control of the second RF resource. In block 522, the wireless device processor may receive a confirmation that the first SIM protocol stack has released control of the second RF resource. In an example, such notification may be in the form of an acknowledgement message. In another example, the wireless device processor may be indirectly notified, such as by detecting that a call or data session has started on the second SIM, from which it may assume that the first SIM protocol stack has relinquished control of the second RF resource (i.e., based on the second SIM being only configured to use the second RF resource). The wireless device processor may return to block 402 (see FIG. 5A), receive another request from the first SIM-1 protocol stack to utilize the second RF resource for receive diversity.

In response to determining that the wireless device is not preparing to enter an active mode on the second SIM (i.e., determination block 518="No"), the wireless device processor may determine whether time T1 (i.e., the time at which the second SIM protocol stack will wake up from sleep state to monitor a paging channel) has been reached in determination block 524. Until time T1 has been reached (i.e., so long as determination block 524="No"), the wireless device processor may allow receive diversity capability on the first SIM protocol stack to continue.

In response to determining that time T1 has been reached (i.e., determination block 524="Yes"), the wireless device processor may receive a confirmation that the first SIM protocol stack has released control of the second RF resource in block 522. As discussed, such notification may be in the form of a direction notification (e.g., an acknowledgement message from the first SIM protocol stack), or an indirect notification that the first SIM protocol stack has released control of the second RF resource (e.g., by detecting operations involved in decoding the paging channel or receiving a paging request by the second SIM protocol stack). The wireless device processor may again receive a request from the first SIM-1 protocol stack to utilize the second RF resource return in block 402 (see FIG. 5A), and repeat the operations of the method 500. Thus, when the second SIM protocol stack begins a call or data communication session on the second RF resource, the first SIM protocol stack may remain in its same mode (e.g., idle mode, connected mode, etc.) but without the benefit of receive diversity.

In various embodiments, in addition to determining whether to provide OMRD capability by granting a request to use the second radio resource, the TRM module may also assist in determining whether/when to activate receive diversity if OMRD capability is enabled. In this manner, the TRM module may provide functions similar to dynamic receive diversity operations that may be performed on a single SIM device.

In general, a variety of parameters may be considered in determining whether to enable receive diversity network capacity, such as the amount of resources allocated by the network, utilization of the network resources by the wireless device, etc. For example, if the network is not experiencing a high load on the network resources (e.g., transmission power), or is using only a small amount of the network's available capacity, receive diversity may remain disabled. In various embodiments, additional factors that may be used to enable or disable receive diversity on a SIM that has been granted control of an RF resource based on OMRD may include, but are not limited to, channel operating conditions, error rates, signal strength measurements, power control parameters, battery level, Quality of Service requirements, application requirements, user settings, higher layer control, transmitter control, pilot channel information, etc. Depending on the diversity scheme, assignment of an RF resource may include any one or more of such additional criteria, either individually or in combination.

In various embodiments, similar to dynamic receive diversity on single-SIM devices, when enabled for the first SIM protocol stack, OMRD may be turned "on" or "off" under certain conditions that may be related to network capacity and current status, the current mode of the first SIM protocol stack and first RF resource, as well as the current status or timing schedule of the second SIM protocol stack in order to prevent interference with idle mode processes on the second SIM protocol stack.

In idle mode, the first SIM protocol stack may implement a power-saving mode to reduce power consumption. Depending on the particular radio access technologies associated with the first and second SIMs, the power-saving mode may be the same or different from that of the first SIM protocol stack. In embodiments in which the second SIM is associated with a UMTS/WCDMA, the SIM protocol stack may use discontinuous reception (DRX) in idle mode to receive pages on a paging channel (PCH). The PCH is a downlink transport channel that is always transmitted over the entire cell, and that is associated with the transmission of physical-layer generated paging indicators.

In an example UMTS/WCDMA system, paging indicators may be carried on a paging indicator channel (PICH), which is associated with a secondary common control physical channel (S-CCPCH) to which the PCH may be mapped. A paging indicator set in a PICH frame indicates an associated paging message transmitted on the PCH in the S-CCPCH frame starting $t_{PICH}$ chips after the transmitted PICH frame.

In contrast to GSM, a wireless device or SIM connected to a UMTS/WCDMA network does not monitor the paging channel, but rather monitors the PICH channel, which may be easily demodulated at the Layer 1 level of the UMTS/WCDMA protocol stack. Specifically, a UMTS/WCDMA wireless device or SIM in idle mode may monitor a particular paging indicator assigned by its paging group, but need only do so during one paging occasion (i.e., PICH frame) per DRX cycle, which may be identified by a system frame number. In UMTS/WCDMA networks, radio frames are typically 10 ms, and each DRX cycle may be $2^k$ frames, where k may be set by the network. Therefore, the active period length for a wireless device or SIM connected to a UMTS/WCDMA network may typically be 10 ms, during which the device may monitor the downlink PICH. If the paging indicator assigned to that device does not indicate a page, then the device may enter the next sleep period.

In various embodiments, the first SIM protocol stack may have control of the second RF resource, and may be using OMRD while in idle mode. Before entering the sleep period in each power-saving cycle (e.g., DRX), the wireless device processor may implement OMRD processes to determine an appropriate receive diversity status for the next wakeup time on the first SIM protocol stack.

Figure 6:
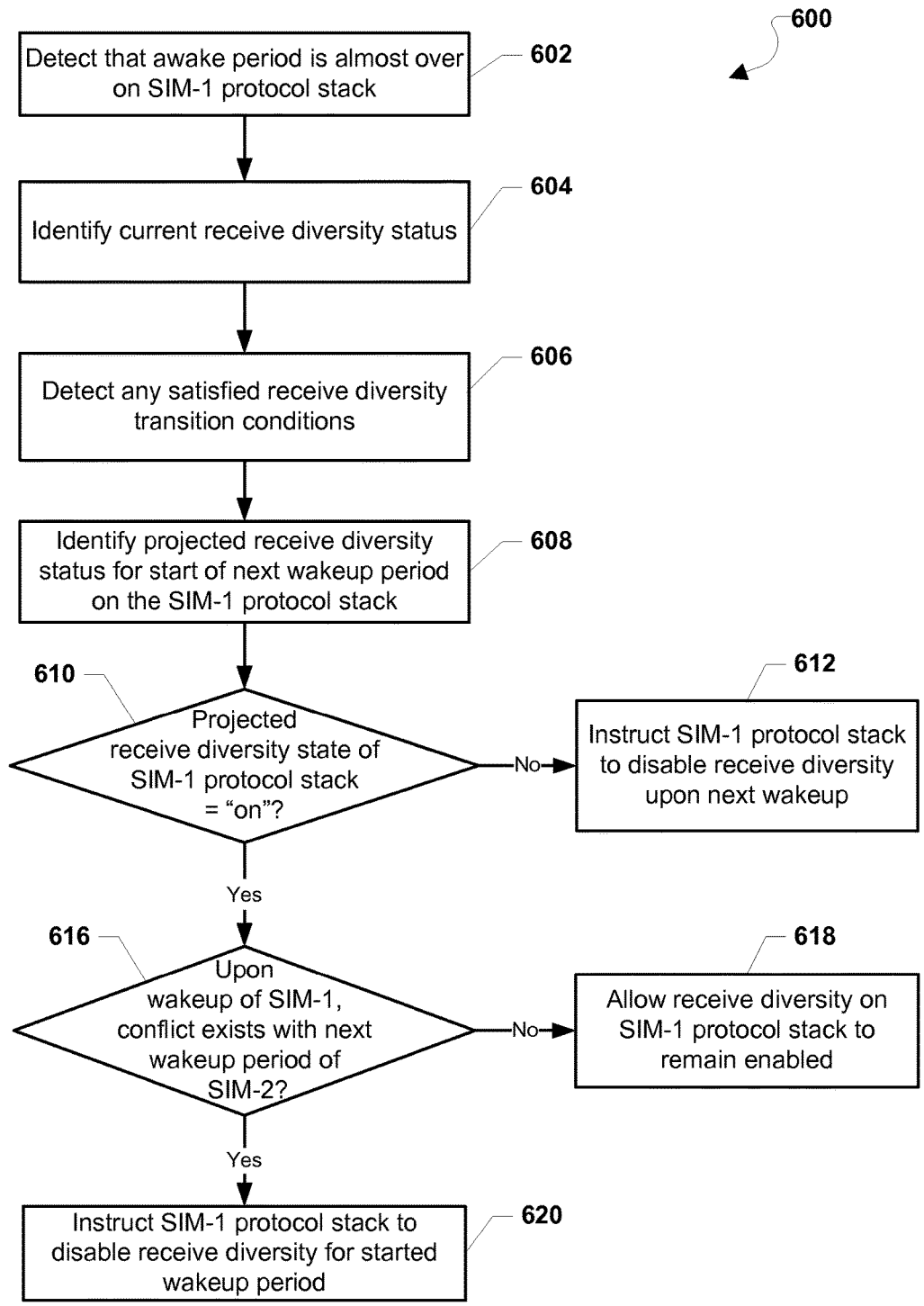
FIG. 6 is a process flow diagram illustrating a method for implementing dynamic receive diversity within operations of OMRD on a dual-SIM wireless communication device according to various embodiments.

FIG. 6 illustrates a method 600 of dynamic receive diversity management within OMRD, which may allow the first SIM protocol stack to exercise capabilities to enable and disable receive diversity within OMRD. With reference to FIGS. 1-6, the operations of method 600 may be implemented in the TRM module 308 by one or more processors of the wireless device 200, such as the general purpose processor 206 and/or baseband modem processor(s) 216, or a separate controller (not shown) that may be coupled to the memory 214 and to the baseband modem processor(s) 216. While described with reference to the first SIM being associated with UTMS/WCDMA, such references to these access technologies are used merely as an example, and do not limit the applicability of the method 600 to any particular protocols/access technologies.

In block 602, the wireless device processor may detect that an awake period associated with a power-saving mode (e.g., DRX) of the first SIM is almost over, and in block 604 may identify the current receive diversity status of the first SIM protocol stack (i.e., whether the first SIM protocol stack is using receive diversity (i.e., enabled/"on") or is only using the first RF resource (i.e., disabled/"off").

In block 606, the wireless device processor may detect any receive diversity transition conditions that may be satisfied. That is, the wireless device processor may determine whether the current receive diversity status for the first SIM protocol stack should be changed, either from "on" to "off" or vice versa, for the next wakeup cycle. In various embodiments, a number of transition change conditions may exist for this determination, and may be used separately or in combination. Such conditions may either indicate normal/good performance by the first RF resource, or alternatively may indicate that reception quality is poor on the first RF resource, and would benefit from receive diversity. In various embodiments, the wireless device processor may receive information relating the first SIM protocol stack satisfying transition conditions by notification from the first SIM protocol stack, by querying the first SIM protocol stack, and/or by detecting any of a number of indicators.

In an example, if receive diversity is currently disabled, a transition condition (i.e., to turn receive diversity "on") may be satisfied by detecting that the power level of the pilot channel of the serving cell dropped below a certain threshold during the awake period. In another example, if receive diversity is currently disabled a transition condition may be satisfied by receiving a paging indicator during the awake period and failing to decode the corresponding S-CCPCH to receive the associated page on the PCH.

If receive diversity is currently enabled, transition conditions (i.e., to turn receive diversity "off") may be satisfied by detecting that the power level of the pilot channel of the serving cell is above a certain minimum threshold during the awake period, and that no paging indicator was received in the paging occasion monitored during the awake period.

In block 608, the wireless device processor may identify a projected receive diversity state for the start of the next wakeup period of the first SIM, such as based on the current state whether receive diversity change conditions are satisfied. In determination block 610, the wireless device processor may determine whether the projected receive diversity state for the next wakeup period on the first SIM protocol stack is "on." In response to determining that the projected receive diversity state for the next wakeup period of the first SIM protocol stack is "off" (i.e., determination block 610="No"), in block 612, the wireless device processor may instruct the first SIM protocol stack to disable receive diversity upon the next wakeup from sleep state according to its scheduled power-saving mode (e.g., DRX cycle).

In response to determining that the projected receive diversity state for the next wakeup period of the first SIM protocol stack is "on" (i.e., determination block 610="Yes"), the wireless device processor may determine whether the started wakeup period for the first SIM protocol stack will conflict with the next wakeup period for the second SIM protocol stack in determination block 616. To ensure that no conflict occurs, it may be assumed that the started wakeup period duration will include both the time to decode the paging indicator of the PICH frame and the time to decode the associated paging information on the S-CCPCH. Using the known power-saving mode (e.g., DRX) cycle schedule associated with the second SIM, the wireless device processor may identify any overlap between the first SIM and second SIM wakeup periods.

In response to determining that the started wakeup period for the first SIM protocol stack will not conflict with the next wakeup period for the second SIM (i.e., determination block 616="No"), the wireless device processor may allow receive diversity to remain enabled on the first SIM protocol stack in block 618.

In response to determining that the current wakeup period for the first SIM protocol stack will conflict with the next wakeup period for the second SIM (i.e., determination block 616="Yes"), the wireless device processor may override the existing receive diversity state in block 620 by instructing the first SIM protocol stack to disable receive diversity for the started wakeup period.

In other embodiments for idle mode arbitration by the TRM module, the first SIM protocol stack may be prompted to disable receive diversity and to release control of the second RF resource prior to starting any PLMN search (e.g., due to cell reselection process triggered) when receive diversity is enabled on the first SIM protocol stack. Because the first SIM protocol stack may be unable to release the second RF resource in the middle of a PLMN scan, release control of the second RF resource prior to starting a PLMN search may ensure that the second RF resource will be immediately available if the second SIM transitions to active mode (e.g., starting a mobile terminating communication).

In various embodiments, OMRD state management may also be implemented when the first SIM protocol stack is in a connected mode. As discussed above, many different state conditions may contribute to determining whether to use receive diversity in single SIM device. Using dynamic receive diversity, which allows a device to transition from "on" to "off" and vice versa during the connected mode, may further improve power savings without performance loss. In various embodiments, opportunistic receive diversity on the first SIM protocol stack may be configured to work seamlessly with existing dynamic receive diversity features of the applicable technology. In various embodiments, dynamic receive diversity implemented by one SIM protocol stack may incorporate control processes, such as additional checks relating to the status and schedule of the other SIM protocol stack, based on information from the TRM module. For example, a first SIM protocol stack implementing dynamic receive diversity may be configured to only provide control of the second RF resource to the first SIM protocol stack if the second RF resource will remain available for use for more than a minimum time duration. The minimum time duration may be calculated based on the benefit to be derived from receive diversity, the amount of the time before the next wakeup time T1 on the second SIM protocol stack, the delay in switching receive diversity between "on" and "off," and/or other factors.

Another control process may be implemented as part of dynamic receive diversity on the first SIM protocol stack to prevent the first SIM protocol stack from starting certain actions when receive diversity is turned "on" if those actions will not be completed. For example, using a second minimum time, the first SIM protocols stack may be prevented from performing searches for neighbor cells, location update signaling, and/or other events that utilize receive diversity if less than the second minimum time remains before the next wakeup time T1 on the second SIM protocol stack.

Another control process may be implemented as part of dynamic receive diversity on the first SIM protocol stack to adjust for changes in signal quality that may occur by switching receive diversity from "on" to "off," and vice versa, during high speed communications on the first SIM protocol stack (e.g., using HSDPA protocol). In various embodiments, channel quality may improve as a result of receive diversity. The first SIM protocol stack may send information about the channel quality to the serving network, which may prompt the network to provide more resources for the communication. For example, the first SIM protocols stack may be configured to use HSDPA for communications on a UMTS network, and may send a channel quality indicator (CQI) to the serving network. Based on the CQI received from the first SIM protocol stack, the serving network may transmit data using different transport block sizes. For example, a high CQI may prompt the serving network to transmit a larger transport block size relative to a lower CQI.

Various delays may occur between a change in channel quality and the time at which the serving network adjusts network resources and transport block sizes accordingly. For example, there may be a propagation delay in the uplink reporting to the network, as well as a delay for the network to process the information and apply a change.

In various embodiments, dynamic receive diversity control process may be configured to begin reporting an adjusted measure of channel quality (e.g., an adjusted CQI for HSDPA) in advance of known times at which OMRD state transitions may be scheduled to occur. For example, if receive diversity is turned "on," then if a sufficient minimum time remains before the second SIM protocol stack is scheduled to begin its wakeup period (i.e., at time T1) that will terminate the OMRD state, an adjusted CQI may be computed by subtracting an adjustment value (ΔdB) from the actual CQI value. This adjusted CQI may be transmitted to the network (versus the current CQI) sufficiently in advance of T1 to enable the network to adjust resources and transport block sizes accordingly. Given that OMRD will be disabled (and control of the second RF resource released) by time T1, such advance adjustment of CQI may improve network performance compared to waiting until time T1 to report lower CQI.

Similarly, when less than a sufficient minimum time remains before the second SIM protocol stack is scheduled to begin the sleep state, which will enable OMRD to be initiated for the first SIM, an adjusted CQI may be computed by adding ΔdB to the actual CQI value. Again, this adjusted CQI may be transmitted to the network (versus the current CQI) sufficiently in advance of when OMRD will be initiated to enable the network to adjust resources and transport block sizes accordingly. In various embodiments, the sufficient minimum time may be set according to a default value (e.g., 5 ms), which may be adjusted based on the actual delay between receiving a CQI report by the network and the network response of applying a transport block size adjustment.

In various embodiments, the ΔdB value may be a static default value (e.g., 3 dB), or may be a dynamically computed value that accounts for receive diversity imbalance between the first and second RF resources. For example, ΔdB may be dynamically computed based on the ratio of total signal power received on both the first and second RF resources ("$P_{ALL}$") to the total power use for only the first RF resource ("$P_{RF1}$"). In some embodiments, this computation may be performed as:

$$\Delta \mathrm{dB} = 10 \log_{10} \cdot \frac{P_{ALL}}{P_{RF1}}$$

By anticipating the increases and decreases in channel quality that may occur due to receive diversity state changes, efficiency of transitions may be improved and high speed throughput may be experienced for a longer amount of time.

Various other improvements and adjustments may be implemented to prevent performance loss associated with opportunistically allowing use of the second RF resource for receive diversity. Such improvements and adjustments may be specific to particular wireless communication protocols implemented by the first SIM, but may be similarly applied to a variety of high speed wireless communication protocols. For example, in normal high speed communications on the first SIM protocol stack, a selection algorithm may be implemented that selects between a rake and equalizer and/or interference cancellation receiver to decode downlink transport channels, such as based on the path that provides the best channel quality. Transitioning between receive diversity states may cause the selection algorithm to prompt unnecessary switching between the rake and equalizer/interference cancellation receivers. To prevent this effect, in various embodiments, the switching algorithm may be halted for at least a minimum number of subframes following the diversity state change due to the start or end of an awake period on the second SIM protocol stack.

In another example, after receiving control of the second RF resource turning receive diversity "on," assignment of fingers of a rake receiver associated with communications on the first SIM may be delayed until a next assignment cycle begins, which may be at predetermined time intervals. As such, the benefit of receive diversity may be not realized on the primary receiver until the new cycle begins, which may affect high speed performance. To prevent this, after receive diversity is enabled, an immediate search of the serving cell using different PN offsets may be performed. The results of the search (i.e., PN offsets with strong correlations in the received signal) may be utilized to assign the fingers of the rake receiver for receive diversity operation.

In other embodiments, various improvements may be associated with minimizing the delay in enabling receive diversity following receiving control of the second RF resource on the first SIM protocol stack. For example, receive diversity may be associated with switching to a higher voltage/clock rate. However, the overhead associated with such a switch may cause additional delay in enabling receive diversity after gaining control of the second RF resource. Given the short amount of time that may be associated with the second SIM protocol stack awake period, the first SIM protocol stack may maintain the higher voltage/clock rate after releasing control of the second RF resource.

As discussed, TRM operations in various embodiments may be based on the particular radio access technologies enabled by each SIM and the rules configured for various TRM processes. In some embodiments, TRM arbitration may be configured to always prioritize certain communications over others. In other embodiments, TRM arbitration may be configured to evaluate the different modes on both or all SIMs to make such determinations. Further, the TRM operations may be configured to arbitrate RF resource assignment considering multiple radio access technologies may be enabled by a single SIM.

For example, in some systems (referred to as "hybrid" systems), a wireless service provider may implement more than one air interface protocol or radio access technology, which may be supported by a SIM associated with that service provider. For example, a particular SIM may support a CDMA protocol, such as described in EIA/TIA/IS-2000 Rel. 0, A ("1xRTT" or "1x") for both circuit-switched and packet-switched communications, as well as a high speed data protocol such as described in EIA/TIA/IS-856 Rel. 0, A, ("EVDO" or "DO") for packet-switched communications. In a hybrid system, a wireless device or SIM may be configured to participate in communications using either protocol/radio access technology, depending, for example, on the type of communication, network conditions, etc. Further, in a hybrid system, a wireless device might not only hand off between coverage areas under a common air interface protocol (e.g., between 1xRTT sectors), but may also hand off between the different air interface protocols, such as between 1xRTT and DO. A protocol stack associated with the particular SIM, which may be a combined protocol stack (e.g., as described in 1xEV-DO Release A and B), may hand off between interface protocols in any of a number of ways.

In an example hybrid 1xRTT/DO system, a wireless device may be configured to implement a hybrid mode to monitor activity on more than one radio access technology. For example, when engaged in an active DO communication session, the wireless device may operate in a hybrid mode by periodically scanning a 1xRTT paging channel and/or other control channel for paging requests and control messages. Since the DO and 1xRTT air interfaces utilize different RF frequencies, the wireless device may tune to the 1xRTT interface (i.e., away from the DO interface) to perform such scans.

The "tune away" scans in hybrid mode may interrupt the ongoing DO communication session, thereby reducing data throughput. To reduce the impact of tune away scans, a wireless device may be configured with both a high-gain (primary) and low-gain (secondary) antenna that may be simultaneously tuned to the same or different RF frequencies, thereby providing capability for "simultaneous hybrid dual receive" ("SHDR") operation. In SHDR operation, both antennas may be tuned to the DO air interface to engage in the active DO communication, and may use only the low-gain antenna to perform the tune away scans on the 1xRTT interface. In this manner, the DO communication may remain continuous during the tune away scans. However, if signals received on the 1xRTT interface are too weak to be reliably detected by the low-gain antenna (e.g., due to the device location in the serving sector), the wireless device may revert to the legacy mode of operation in which both antennas may tune away to the 1xRTT interface.

While described with respect to DO and 1x protocols, the various embodiments may apply to combinations of other wireless voice and data protocols, including GSM, UTMS/WCDMA, LTE, etc.

In a DSDA device in which one or more SIM supports a hybrid system, TRM operations may be configured to arbitrate access to two RF resources between three or more radio access technologies. In various embodiments, by providing use of a second RF resource, TRM operations may allow a SIM that supports a hybrid communication system (i.e., multiple access protocols or radio access technologies) to operate using a receive capability similar to SHDR in certain scenarios. In other scenarios, providing use of a second RF resource by the SIM supporting the hybrid system may allow receive diversity to be implemented on one of the multiple radio access technologies.

FIGS. 7A-7E illustrate TRM module arbitration methods 700, 701, 703, 705, 707 that may be implemented in a wireless device, such as a DSDA device, configured with a first SIM that supports communications in a hybrid system (e.g., 1xRTT/DO) and a second SIM that supports a 2G radio access standard (e.g., GSM). In various embodiments, the radio access technologies and related network configurations may be such that a protocol stack associated with the first SIM is able to utilize an RF resource associated with the second SIM, but the protocol stack associated with the second SIM is not capable of utilizing the RF resource associated with the first SIM. While described with reference to 1xRTT/DO and/or GSM networks, the embodiments illustrated in FIGS. 7A-7E may be implemented for any of a number of radio access technologies and/or modes. The methods 700, 701, 703, 705, 707 provide some examples of such arbitration, but any of a number of arbitration schemes may be developed by configuring different relative priorities between communications and/or modes for the SIMs. With reference to FIGS. 1-3 and 7A-7E, the operations of methods 700, 701, 703, 705, 707 may be implemented in the TRM module 308 by one or more processors of the wireless device 200, such as the general purpose processor 206 and/or baseband modem processor(s) 216, or a separate controller (not shown) that may be coupled to the memory 214 and to the baseband modem processor(s) 216.

In block 702, the wireless device processor may identify radio access technologies (RATs) supported by each of the first SIM ("SIM-1") and the second SIM ("SIM-2"), and a current mobility mode associated with each identified radio access technology. For example, the wireless device processor may identify multiple radio access technologies (e.g., 1x and DO) supported by the first SIM, a 2G radio access technology (e.g., GSM) supported by the second SIM, and current modes for all three technologies (e.g., idle mode, connected mode, etc.). Such modes may be implemented in layers of protocol stacks associated with each of the first and second SIMs. In various embodiments, a hybrid mode wireless device in idle mode may implement a power-saving mode on each protocol stack associated with a SIM and/or each enabled radio access technology for a protocol stack supporting more than one radio access technology. As discussed, such power-saving modes may involve cycles of sleep periods (i.e., conserving battery power) and awake periods (i.e., monitoring one or more paging channel), which may be specified by the a wires device system operator.

In determination block 704, the wireless device processor may determine whether the first SIM protocol stack is in idle mode and currently in a sleep cycle for both DO and 1xRTT. In response to determining that the first SIM protocol stack is in idle mode and currently in a sleep cycle for both DO and 1xRTT (i.e., determination block 704="Yes"), the wireless device processor may identify that the RF resource associated with the first SIM ("first RF resource") will be unused, as well as grant use of the RF resource associated with the second SIM ("second RF resource") to the second SIM protocol stack in block 706.

In response to determining that the first SIM protocol stack is not in idle mode for both DO and 1xRTT, and/or is not currently in a sleep cycle for both DO and 1xRTT (i.e., determination block 704="No"), the wireless device processor may determine whether the second SIM protocol stack is in idle mode and currently in a sleep cycle in determination block 708. In response to determining that the second SIM protocol stack is in idle mode and currently in a sleep cycle (i.e., determination block 708="Yes"), the wireless device processor may perform arbitration operations in method 701 beginning in determination block 714 as described (e.g., with reference to FIG. 7B).

In response to determining that the second SIM protocol stack is either not in idle mode or not currently in a sleep cycle (i.e., determination block 708="No"), the wireless device processor may determine whether the second SIM protocol stack is currently in a service acquisition mode in determination block 710, such as attempting to find PLMNs and/or camp on a cell of a desired network. In response to determining that the second SIM protocol stack is currently in a service acquisition mode (i.e., determination block 710="Yes"), the wireless device processor may perform arbitration operations in method 703 beginning in determination block 714 as described (e.g., with reference to FIG. 7C).

In response to determining that the second SIM protocol stack is not currently in a service acquisition mode (i.e., determination block 710="No"), the wireless device processor may determine whether the second SIM protocol stack is in idle mode and currently in its awake period in determination block 712, such as when monitoring a paging channel. In response to determining that the second SIM protocol stack is in idle mode and currently in its awake period (i.e., determination block 712="Yes"), the wireless device processor may perform arbitration operations in method 705 beginning in determination block 714 as described (e.g., with reference to FIG. 7D). In response to determining that the second SIM protocol stack is either not in idle mode or not currently in its awake period (i.e., determination block 712="No"), the wireless device processor may perform arbitration operations in method 707 beginning in determination block 714 as described below (e.g., with reference to FIG. 7E).

With reference to the method 701, in determination block 714, the wireless device processor may determine whether the first SIM protocol stack is in idle mode and currently in a sleep cycle for 1xRTT. In response to determining that the first SIM protocol stack is in idle mode for 1xRTT and in its sleep cycle for 1xRTT (i.e., determination block 714="Yes"), the wireless device processor may allow the first SIM protocol stack to use the second RF resource in block 716 in order to provide receive diversity capability on DO.

In response to determining that the first SIM protocol stack is either not in idle mode for 1xRTT or not in a sleep cycle for 1xRTT (i.e., determination block 714="No"), the wireless device processor may determine whether the first SIM protocol stack is in idle mode and currently in a sleep cycle for DO in determination block 718. In response to determining that the first SIM protocol stack is in idle mode and currently in a sleep cycle for DO (i.e., determination block 718="Yes"), the wireless device processor may allow the first SIM protocol stack to use the second RF resource in block 720 in order to provide receive diversity capability on 1xRTT. In response to determining that the first SIM protocol stack is either not in idle mode or not currently in a sleep cycle for DO (i.e., determination block 718="No"), the wireless device processor may allow the first SIM protocol stack to use the first RF resource on DO, and to use the second RF resource on 1xRTT in block 722.

Figure 7A:
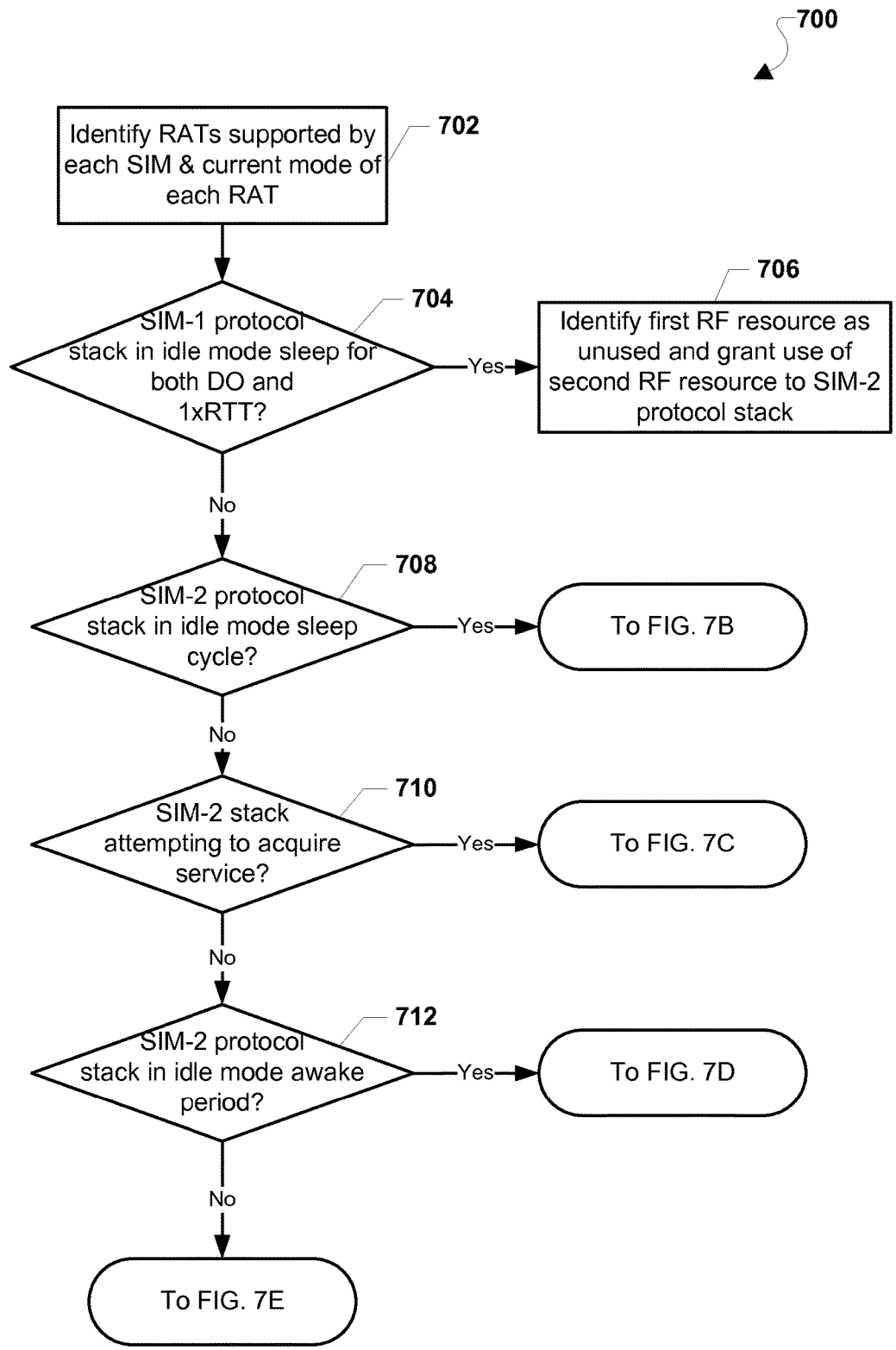
FIGS. 7A-7E are process flow diagrams illustrating another method for implementing OMRD in an example dual-SIM wireless communication device according to various embodiments.
Figure 7B:
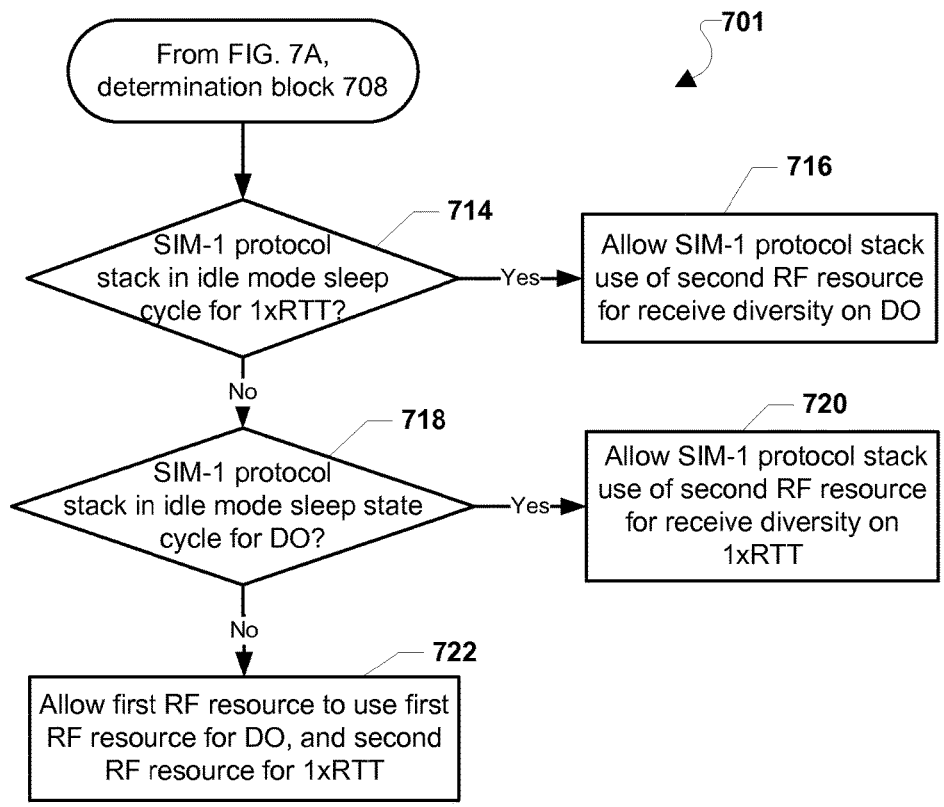
Figure 7C:
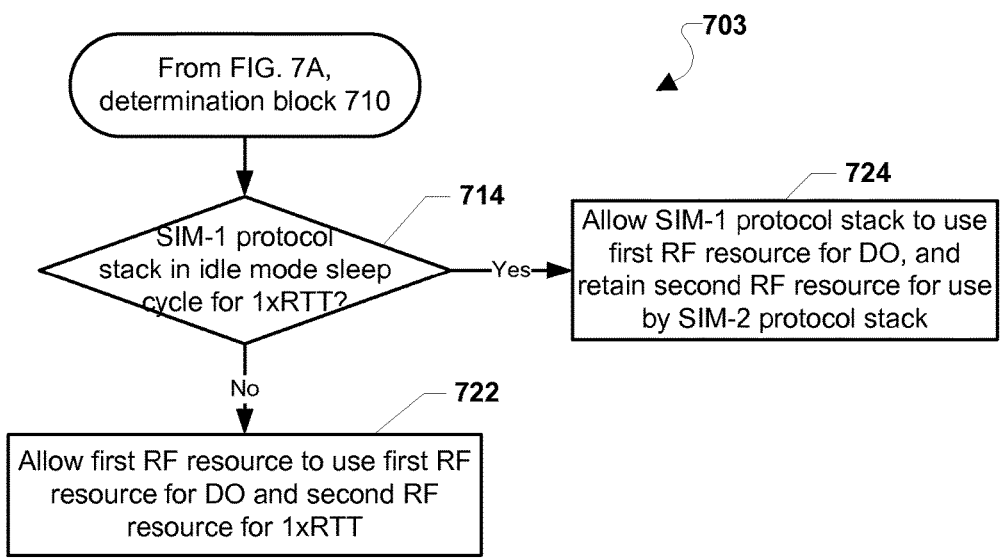
Figure 7D:
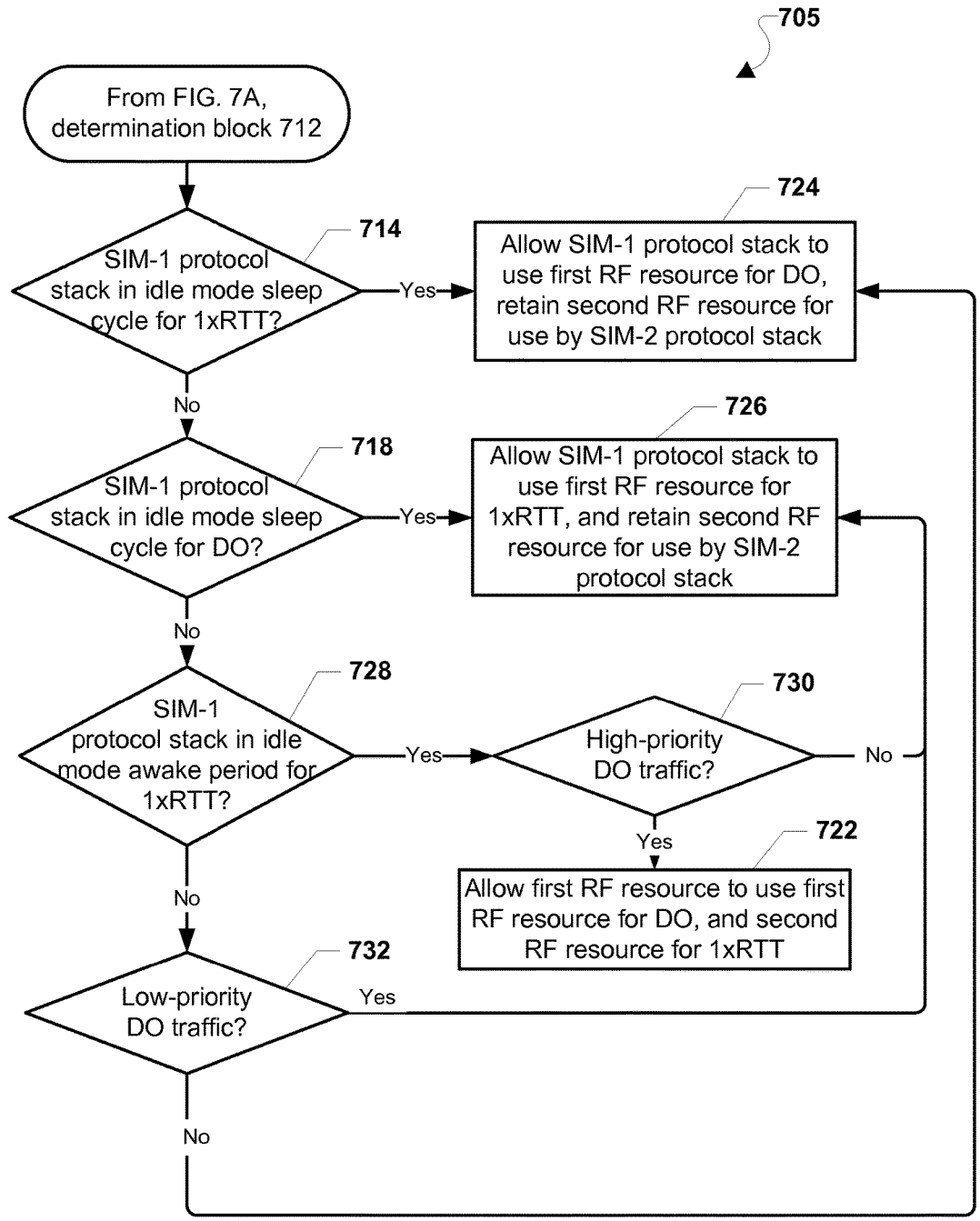
Figure 7E:
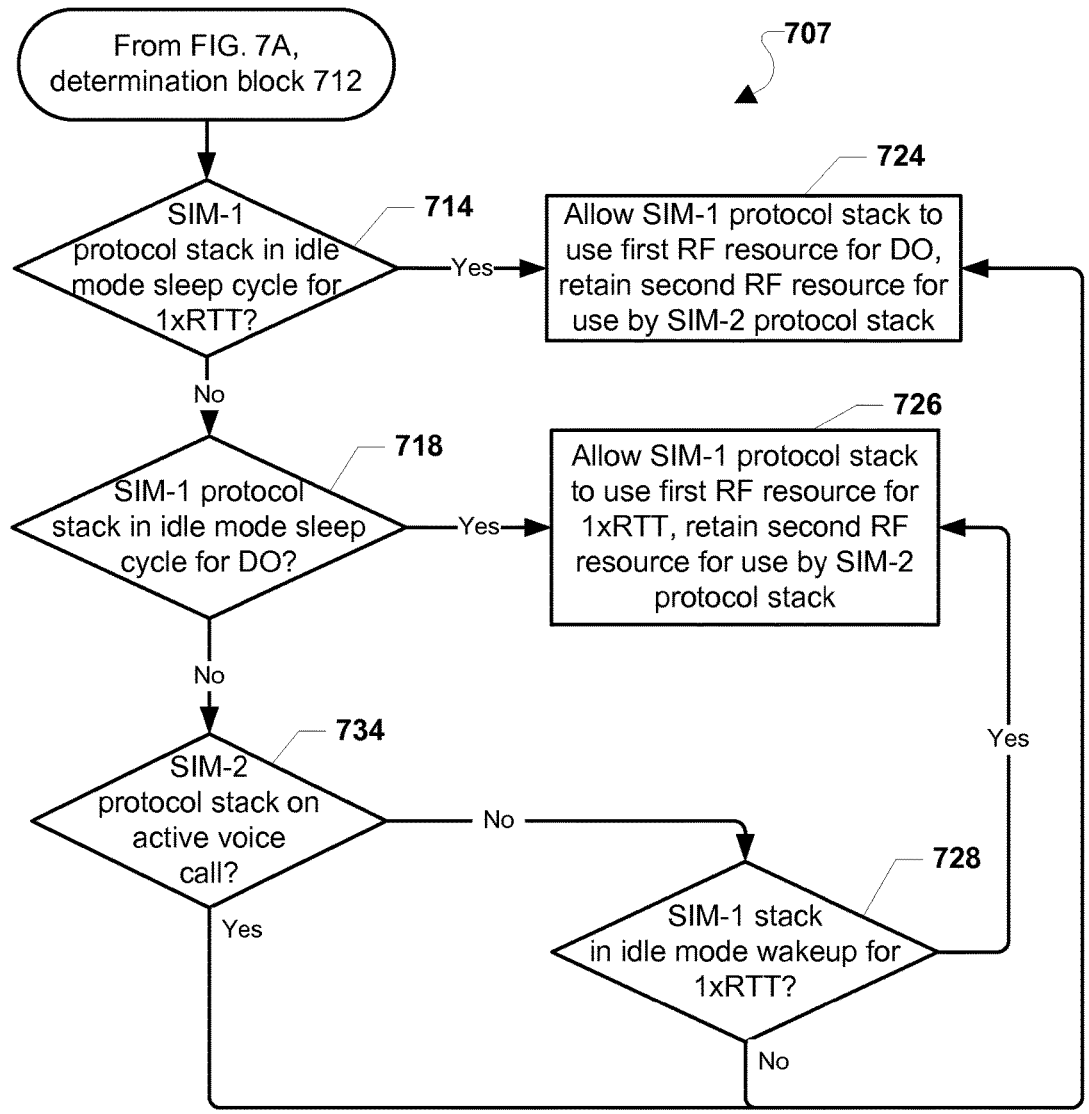

With reference to the method 703, the method 703 may begin with the determination block 714 (e.g., as in the method 701 of FIG. 7B). In response to determining that the first SIM protocol stack is in idle mode for 1xRTT and in its sleep cycle for 1xRTT (i.e., determination block 714="Yes"), the wireless device processor may allow the first SIM protocol stack to use the first RF resource for DO in block 724, and allow the second SIM protocol stack to retain use of the second RF resource. In response to determining that the first SIM protocol stack is either not in idle mode for 1xRTT or not currently in a sleep cycle for 1xRTT (i.e., determination block 714="No"), the wireless device processor may allow the first SIM protocol stack to use the first RF resource on DO, and to use the second RF resource on 1xRTT in block 722.

With reference to the method 705, the method 705 may begin with the determination block 714 (e.g., as in the method 701 of FIG. 7B). In response to determining that the first SIM protocol stack is in idle mode for 1xRTT and in its sleep cycle for 1xRTT (i.e., determination block 714="Yes"), the wireless device processor may allow the first SIM protocol stack to use the first RF resource for DO in block 724, and allow the second SIM protocol stack to retain use of the second RF resource.

In response to determining that the first SIM protocol stack is either not in idle mode for 1xRTT or not currently in a sleep cycle for 1xRTT (i.e., determination block 714="No"), the wireless device processor may determine whether the first SIM protocol stack is in idle mode and currently in a sleep cycle for DO in determination block 718. In response to determining that the first SIM protocol stack is in idle mode and currently in a sleep cycle for DO (i.e., determination block 718="Yes"), the wireless device processor may allow the first SIM protocol stack to use the first RF resource for 1xRTT and allow the second SIM protocol stack to retain use of the second RF resource in block 726.

In response to determining that the first SIM protocol stack is either not in idle mode or not currently in a sleep cycle for DO (i.e., determination block 718="No"), the wireless device protocol stack may determine whether the first SIM protocol stack is in idle mode and currently in an awake period for 1xRTT in determination block 728. In response to determining that the first SIM protocol stack is in idle mode and currently in an awake period for 1xRTT (i.e., determination block 728="Yes"), the wireless device may determine whether the first SIM protocol stack is currently sending/receiving high priority traffic using DO in determination block 730. In response to determining that the first SIM protocol stack is currently sending/receiving high priority traffic using DO (i.e., determination block 730="Yes"), the wireless device processor may allow the first SIM protocol stack to use the first RF resource on DO, and to use the second RF resource on 1xRTT in block 722. In response to determining that the first SIM protocol stack is not currently sending/receiving high priority traffic using DO (i.e., determination block 730="No"), the wireless device processor may allow the first SIM protocol stack to use the first RF resource for 1xRTT and allow the second SIM protocol stack to retain use of the second RF resource in block 726.

In response to determining that the first SIM protocol stack is either not in idle mode or not currently in an awake period for 1xRTT (i.e., determination block 728="No"), the wireless device processor may the wireless device may determine whether the first SIM protocol stack is currently sending/receiving low-priority traffic using DO in determination block 732. In response to determining that the first SIM protocol stack is not currently sending/receiving low-priority traffic using DO (i.e., determination block 732="No"), the wireless device processor may allow the first SIM protocol stack to u se the first RF resource for DO in block 724, and allow the second SIM protocol stack to retain use of the second RF resource. In response to determining that the first SIM protocol stack is currently sending/receiving low-priority traffic using DO (i.e., determination block 732="Yes"), the wireless device processor may allow the first SIM protocol stack to use the first RF resource for 1xRTT and allow the second SIM protocol stack to retain use of the second RF resource in block 726.

With reference to the method 707, the method 707 may begin with the determination block 714 (e.g., as in the method 701 of FIG. 7B). In response to determining that the first SIM protocol stack is in idle mode for 1xRTT and in its sleep cycle for 1xRTT (i.e., determination block 714="Yes"), in block 724 the wireless device processor may allow the first SIM protocol stack to use the first RF resource for DO, and allow the second SIM protocol stack to retain use of the second RF resource. In response to determining that the first SIM protocol stack is either not in idle mode for 1xRTT or not currently in a sleep cycle for 1xRTT (i.e., determination block 714="No"), the wireless device processor the wireless device processor may determine whether the first SIM protocol stack is in idle mode and currently in a sleep cycle for DO in determination block 718. In response to determining that the first SIM protocol stack is in idle mode and currently in a sleep cycle for DO (i.e., determination block 718="Yes"), the wireless device processor may allow the first SIM protocol stack to use the first RF resource for 1xRTT and allow the second SIM protocol stack to retain use of the second RF resource in block 726.

In response to determining that the first SIM protocol stack is either not in idle mode or not currently in a sleep cycle for DO (i.e., determination block 718="No"), the wireless device processor may determine whether the second SIM protocol stack is currently participating in an active voice call in determination block 734. In response to determining that the second SIM protocol stack is participating in an active voice call (i.e., determination block 734="Yes"), the wireless device processor may allow the first SIM protocol stack to use the first RF resource for DO in block 724, and allow the second SIM protocol stack to retain use of the second RF resource.

In response to determining that the second SIM protocol stack is not currently participating in an active voice call (i.e., determination block 734="No"), the wireless device processor may determine whether the first SIM protocol stack is in idle mode and currently in an awake period for 1xRTT in determination block 728. In response to determining that the first SIM protocol stack is in idle mode and currently in an awake period for 1xRTT (i.e., determination block 728="Yes"), the wireless device may allow the first SIM protocol stack to use the first RF resource for 1xRTT and allow the second SIM protocol stack to retain use of the second RF resource in block 726. In response to determining that the first SIM protocol stack is either not in idle mode or not currently in an awake period for 1xRTT (i.e., determination block 728="No"), the wireless device processor may allow the first SIM protocol stack to use the first RF resource for DO in block 724, and allow the second SIM protocol stack to retain use of the second RF resource.

The various arbitration outcomes arrived at in FIGS. 7A-7E may instead be derived based on one or more array data structures. In the various embodiments, since arbitration between SIMs may be performed using predetermined outcomes for different combinations of parameter values (e.g., current mode on each radio access technology, whether sending/receiving high speed data, etc.) Thus, for the same use cases discussed above with reference to FIGS. 7A-7E), the wireless device processor may instead access the corresponding information pre-stored in the matrix.

Figure 8:
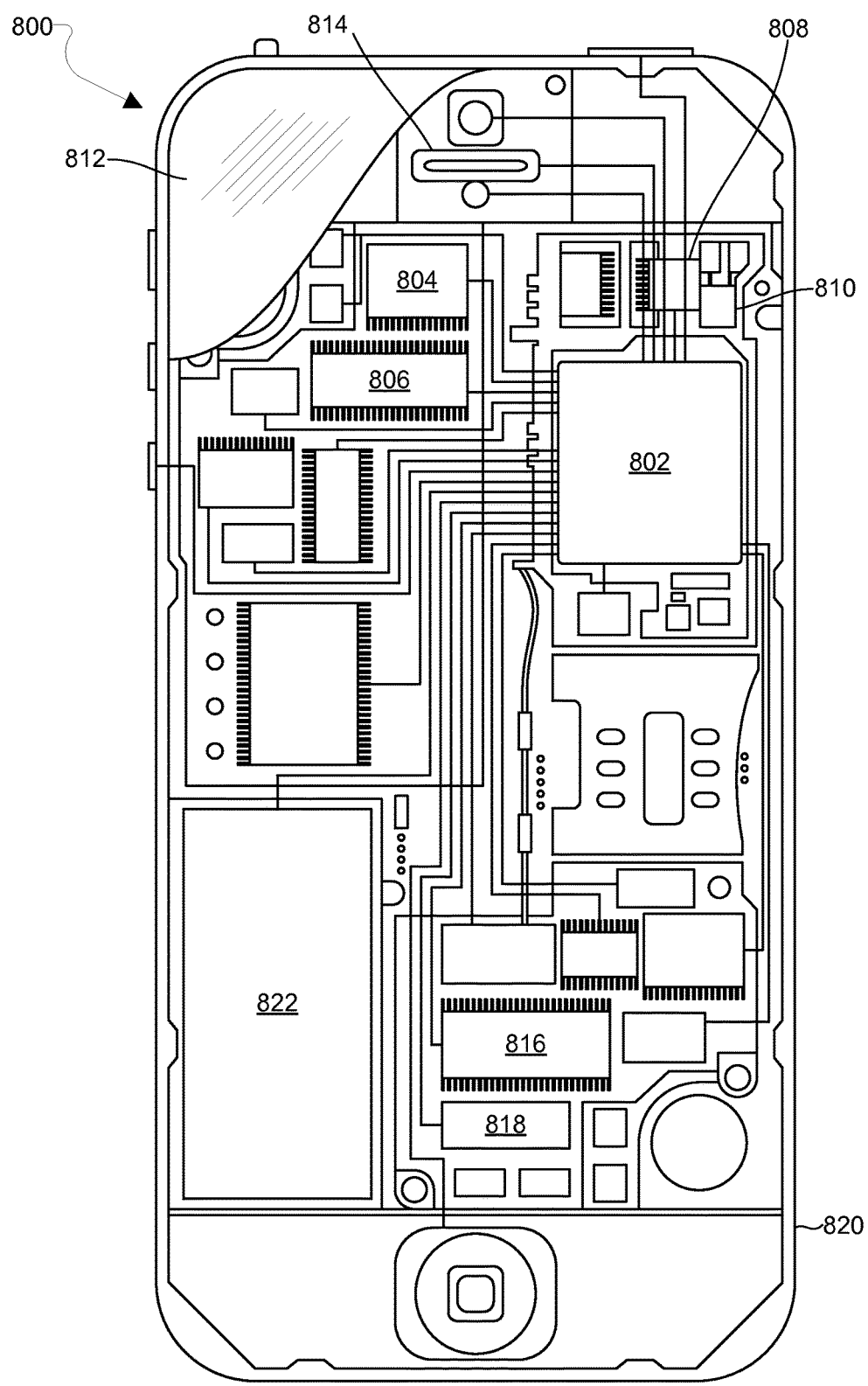
FIG. 8 is a component diagram of an example wireless device suitable for use with various embodiments.

Various embodiments may be implemented in any of a variety of wireless devices, an example of which (wireless device 800) is illustrated in FIG. 8. For example, the wireless device 800 may include a processor 802 coupled to a touchscreen controller 804 and an internal memory 806. The processor 802 may be one or more multicore ICs designated for general or specific processing tasks. The internal memory 806 may be volatile or non-volatile memory, and may also be secure and/or encrypted memory, or unsecure and/or unencrypted memory, or any combination thereof. According to various embodiments, the wireless device 800 may correspond to the wireless device 200 (e.g., FIG. 2) and may implement the methods 400-707 (e.g., FIGS. 4-7E).

The touchscreen controller 804 and the processor 802 may also be coupled to a touchscreen panel 812, such as a resistive-sensing touchscreen, capacitive-sensing touchscreen, infrared sensing touchscreen, etc. The wireless device 800 may have one or more radio signal transceivers 808 (e.g., Peanut®, Bluetooth®, Zigbee®, Wi-Fi, RF radio) and antennae 810, for sending and receiving, coupled to each other and/or to the processor 802. The transceivers 808 and antennae 810 may be used with the above-mentioned circuitry to implement the various wireless transmission protocol stacks and interfaces. The multicore device 800 may include a cellular network wireless modem chip 816 that enables communication via a cellular network and is coupled to the processor. The multicore device 800 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The multicore device 800 may also include speakers 814 for providing audio outputs. The multicore device 800 may also include a housing 820, constructed of a plastic, metal, or a combination of materials, for containing all or some of the components discussed herein. The multicore device 800 may include a power source 822 coupled to the processor 802, such as a disposable or rechargeable battery. The rechargeable battery may also be coupled to the peripheral device connection port to receive a charging current from a source external to the multicore device 800.

Figure 9:
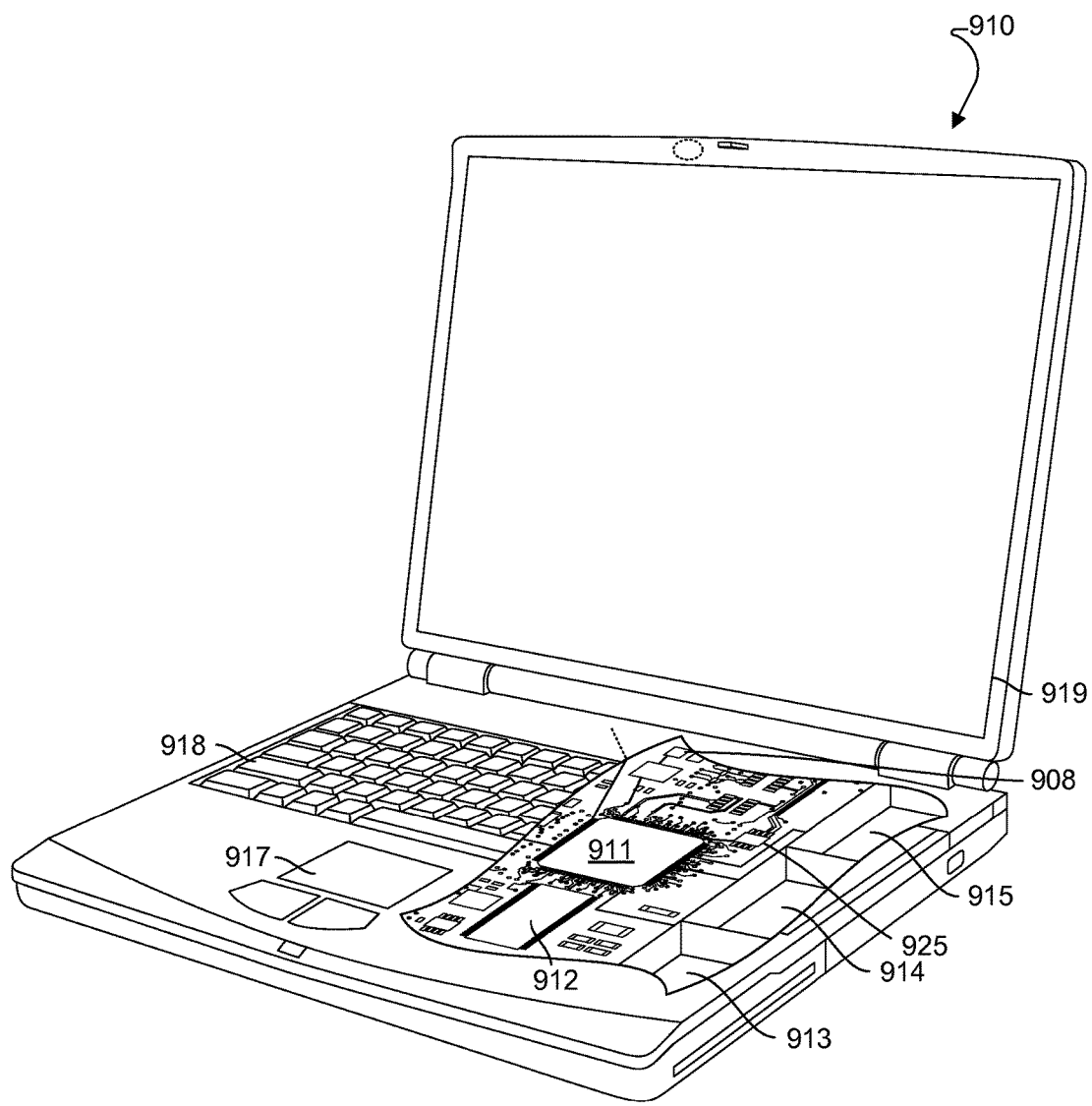
FIG. 9 is a component diagram of another example wireless device suitable for use with various embodiments.

Various embodiments described above may also be implemented within a variety of personal computing devices, such as a laptop computer 900 as illustrated in FIG. 9. Many laptop computers include a touch pad touch surface 917 that serves as the computer's pointing device, and thus may receive drag, scroll, and flick gestures similar to those implemented on wireless computing devices equipped with a touch screen display and described above. A laptop computer 900 will typically include a processor 911 coupled to volatile memory 912 and a large capacity nonvolatile memory, such as a disk drive 913 of Flash memory. The computer 900 may also include a floppy disc drive 914 and a compact disc (CD) drive 915 coupled to the processor 911. The computer 900 may also include a number of connector ports coupled to the processor 911 for establishing data connections or receiving external memory devices, such as a USB or FireWire® connector sockets, or other network connection circuits for coupling the processor 911 to a network. In a notebook configuration, the computer housing includes the touchpad 917, the keyboard 918, and the display 919 all coupled to the processor 911. Other configurations of the computing device may include a computer mouse or trackball coupled to the processor (e.g., via a USB input) as are well known, which may also be used in conjunction with various embodiments.

According to various embodiments, the personal computer 900 may correspond to the wireless device 200 (e.g., FIG. 2) and may implement the methods 400-707 (e.g., FIGS. 4-7E).

With reference to FIGS. 8-9, the processors 802 and 911 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 806, 912 and 913 before they are accessed and loaded into the processors 802 and 911. The processors 802 and 911 may include internal memory sufficient to store the application software instructions. In many devices the internal memory may be a volatile or nonvolatile memory, such as flash memory, or a mixture of both. For the purposes of this description, a general reference to memory refers to memory accessible by the processors 802, 911, including internal memory or removable memory plugged into the device and memory within the processor 802 and 911, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for implementing opportunistic mobile receive diversity ("OMRD") on a multi-subscriber identification module (SIM) wireless communication device having at least a first SIM associated with a first radio frequency (RF) resource and a second SIM associated with a second RF resource, comprising:
   receiving a request from a protocol stack associated with the first SIM to utilize the second RF resource for receive diversity;
   determining whether a protocol stack associated with the second SIM currently has a lower priority than the protocol stack associated with the first SIM; and
   granting control of the second RF resource to the protocol stack associated with the first SIM in response to determining that the protocol stack associated with the second SIM currently has a lower priority than the protocol stack associated with the first SIM,
   wherein granting control provides to the protocol stack associated with the first SIM a capability to enable and disable receive diversity using the first and second RF resources, and wherein enabling receive diversity configures the first and second RF resources to receive, while the first SIM protocol stack is not in idle mode, a downlink signal associated with the first SIM by coupling a path for signals associated with the second RF resource to one or more components that process a first RF resource signal path associated with the first SIM.

2. The method of claim 1, wherein determining whether a protocol stack associated with the second SIM currently has a lower priority than the protocol stack associated with the first SIM comprises:
   determining whether the protocol stack associated with the second SIM is currently in idle mode; and
   determining whether a sleep period of an idle mode power-saving cycle supported by the second SIM is longer than a predetermined minimum duration,
   wherein the predetermined minimum duration is configured to provide sufficient time for the protocol stack associated with the first SIM to disable receive diversity and release control of the second RF resource.

3. The method of claim 1, wherein granting control of the second RF resource to the protocol stack associated with the first SIM comprises:
   receiving, prior to a sleep period of an idle mode power-saving cycle supported by the second SIM, an identification of a next wakeup time for the idle mode power-saving cycle supported by the second SIM;
   instructing the protocol stack associated with the first SIM to disable receive diversity and release control of the second RF resource prior to the next wakeup time; and
   detecting that the protocol stack associated with the second SIM has entered the sleep period of the idle mode power-saving cycle supported by the second SIM.

4. The method of claim 3, further comprising:
   determining whether the protocol stack associated with the second SIM is preparing to exit the idle mode power-saving cycle;
   sending an instruction to the protocol stack associated with the first SIM to release the second RF resource in response to determining that the protocol stack associated with the second SIM is preparing to exit the idle mode power-saving cycle; and
   receiving a confirmation that the protocol stack associated with the first SIM has released control of the second RF resource.

5. The method of claim 3, further comprising:
   determining whether the identified next wakeup time for the idle mode power-saving cycle supported by the second SIM has been reached; and
   receiving a confirmation that the protocol stack associated with the first SIM has released control of the second RF resource prior to the identified next wakeup time for the idle mode power-saving cycle supported by the second SIM.

6. The method of claim 1, further comprising receiving a repeat of the request to utilize the second RF resource for receive diversity from the protocol stack associated with the first SIM in response to determining that the protocol stack associated with the second SIM currently does not have a lower priority than the protocol stack associated with the first SIM.

7. The method of claim 1, further comprising exercising the capability to enable and disable receive diversity in response to determining that a protocol stack associated with the second SIM currently has a lower priority than the protocol stack associated with the first SIM, wherein exercising the capability comprises:
   identifying a current receive diversity status for the protocol stack associated with the first SIM;
   detecting any satisfied receive diversity transition conditions;
   identifying a projected receive diversity status for a start of a wakeup period of a next idle mode power-saving cycle supported by the first SIM;
   determining whether a projected receive diversity status for the start of the wakeup period of the next idle mode power-saving cycle supported by the first SIM comprises an enabled state; and
   instructing the protocol stack associated with the first SIM to disable receive diversity in response to determining that the projected receive diversity status for the start of the wakeup period of the next idle mode power-saving cycle supported by the first SIM does not comprise an enabled state.

8. The method of claim 7, further comprising:
   in response to determining that the projected receive diversity status for the start of the wakeup period of the next idle mode power-saving cycle supported by the first SIM comprises an enabled state:
      allowing the protocol stack associated with the first SIM to enter a sleep state in the next idle mode power-saving cycle with receive diversity enabled;
      reaching the start of the wakeup period of the next idle mode power-saving cycle supported by the first SIM and determining whether the started wakeup period will overlap with a next wakeup period of the idle mode power-saving cycle supported by the second SIM; and
      instructing the protocol stack associated with the first SIM to disable receive diversity in response to determining that the started wakeup period will overlap with a next wakeup period of the idle mode power-saving cycle supported by the second SIM.

9. The method of claim 1, wherein the first SIM is associated with at least a first radio access technology and the second SIM is associated with at least a second radio access technology different from the first radio access technology.

10. The method of claim 9, further comprising:
determining whether a protocol stack associated with the second SIM currently has a lower priority than the protocol stack associated with the first SIM based at least in part on states or relative priorities of the first and second radio access technologies.

11. The method of claim 1, wherein the capability to enable and disable receive diversity using the first and second RF resources comprises a capability to change between states of a switch that controls at least one of:
a path for signals received on one or more antenna associated with the second RF resource; and
a path for signals that have been processed by one or more component of the second RF resource.

12. The method of claim 1, further comprising granting control of at least a third RF resource to the protocol stack associated with the first SIM in response to determining that the protocol stack associated with the second SIM currently has a lower priority than the protocol stack associated with the first SIM,
wherein the at least third RF resource is associated with one or more of the first and second SIM, and
wherein the at least third RF resource is part of a common RF chain with one or more of the first and second RF resource.

13. The method of claim 1, wherein the multi-SIM wireless communication device has at least a third SIM and a protocol stack associated with the at least third SIM.

14. A wireless communication device comprising:
a first radio frequency (RF) resource associated with a first subscriber identification module (SIM);
a second RF resource associated with a second SIM; and
a processor coupled to first and second RF resources, wherein the processor is configured to:
receive a request from a protocol stack associated with the first SIM to utilize the second RF resource for receive diversity;
determine whether a protocol stack associated with the second SIM currently has a lower priority than the protocol stack associated with the first SIM; and
grant control of the second RF resource to the protocol stack associated with the first SIM in response to determining that the protocol stack associated with the second SIM currently has a lower priority than the protocol stack associated with the first SIM,
wherein granting control provides to the protocol stack associated with the first SIM a capability to enable and disable receive diversity using the first and second RF resources, and wherein enabling receive diversity configures the first and second RF resources to receive, with while the first SIM protocol stack is not in idle mode, a downlink signal associated with the first SIM by coupling a path for signals associated with the second RF resource to one or more components that process a first RF resource signal path associated with the first SIM.

15. The wireless communication device of claim 14, wherein the processor is further configured to:
determine whether the protocol stack associated with the second SIM is currently in idle mode; and
determine whether a sleep period of an idle mode power-saving cycle supported by the second SIM is longer than a predetermined minimum duration,
wherein the predetermined minimum duration is configured to provide sufficient time for the protocol stack associated with the first SIM to disable receive diversity and release control of the second RF resource.

16. The wireless communication device of claim 14, wherein the processor is further configured to grant control of the second RF resource to the protocol stack associated with the first SIM by:
receiving, prior to a sleep period of an idle mode power-saving cycle supported by the second SIM, an identification of a next wakeup time for the idle mode power-saving cycle supported by the second SIM;
instructing the protocol stack associated with the first SIM to disable receive diversity and release control of the second RF resource prior to the next wakeup time; and
detecting that the protocol stack associated with the second SIM has entered the sleep period of the idle mode power-saving cycle supported by the second SIM.

17. The wireless communication device of claim 16, wherein the processor is further configured to:
determine whether the protocol stack associated with the second SIM is preparing to exit the idle mode power-saving cycle;
send an instruction to the protocol stack associated with the first SIM to release the second RF resource in response to determining that the protocol stack associated with the second SIM is preparing to exit the idle mode power-saving cycle; and
receive a confirmation that the protocol stack associated with the first SIM has released control of the second RF resource.

18. The wireless communication device of claim 16, wherein the processor is further configured to:
determine whether the identified next wakeup time for the idle mode power-saving cycle supported by the second SIM has been reached; and
receive a message from the protocol stack associated with the first SIM confirming that the protocol stack associated with the first SIM has disabled receive diversity and released control of the second RF resource prior to the identified next wakeup time for the idle mode power-saving cycle supported by the second SIM.

19. The wireless communication device of claim 14, wherein the processor is further configured to:
receive a repeat of the request to utilize the second RF resource for receive diversity from the protocol stack associated with the first SIM in response to determining that the protocol stack associated with the second SIM currently does not have a lower priority than the protocol stack associated with the first SIM.

20. The wireless communication device of claim 14, wherein the processor is further configured to:
exercise the capability to enable and disable receive diversity in response to determining that a protocol stack associated with the second SIM currently has a lower priority than the protocol stack associated with the first SIM, wherein exercising the capability comprises:
identifying a current receive diversity status for the protocol stack associated with the first SIM;

detecting any satisfied receive diversity transition conditions;

identifying a projected receive diversity status for a start of a wakeup period of a next idle mode power-saving cycle supported by the first SIM;

determining whether a projected receive diversity status for the start of the wakeup period of the next idle mode power-saving cycle supported by the first SIM comprises an enabled state; and instructing the protocol stack associated with the first SIM to disable receive diversity in response to determining that the projected receive diversity status for the start of the wakeup period of the next idle mode power-saving cycle supported by the first SIM does not comprise an enabled state.

21. The wireless communication device of claim 20, wherein in response to determining that the projected receive diversity status for the start of the wakeup period of the next idle mode power-saving cycle supported by the first SIM comprises an enabled state, the processor is further configured to:

allow the protocol stack associated with the first SIM to enter a sleep state in the next idle mode power-saving cycle with receive diversity enabled;

reach the start of the wakeup period of the next idle mode power-saving cycle supported by the first SIM and determine whether the started wakeup period will overlap with a next wakeup period of the idle mode power-saving cycle supported by the second SIM; and instruct the protocol stack associated with the first SIM to disable receive diversity in response to determining that the started wakeup period will overlap with a next wakeup period of the idle mode power-saving cycle supported by the second SIM.

22. The wireless communication device of claim 14, wherein:

the first SIM is associated with at least a first radio access technology and the second SIM is associated with at least a second radio access technology different from the first radio access technology.

23. The wireless communication device of claim 22, wherein:

the processor is further configured to determine whether a protocol stack associated with the second SIM currently has a lower priority than the protocol stack associated with the first SIM based at least in part on states or relative priorities of the first and second radio access technologies.

24. The wireless communication device of claim 14, wherein the capability to enable and disable receive diversity using the first and second RF resources is provided by at least one RF switch configured to control at least one of:

a path for signals received on one or more antenna associated with the second RF resource; and a path for signals that have been processed by one or more component of the second RF resource.

25. The wireless communication device of claim 24, wherein the RF switch is configured to couple the path for signals received on the one or more antenna associated with the second RF resource to the one or more components that process the first RF resource signal path associated with the first SIM.

26. The wireless communication device of claim 24, wherein the RF switch is configured to couple the path for signals that have been processed by the one or more component of the second RF resource to the one or more components that process the first RF resource signal path associated with the first SIM.

27. The wireless communication device of claim 14, wherein the processor is further configured to grant control of at least a third RF resource to the protocol stack associated with the first SIM in response to determining that the protocol stack associated with the second SIM currently has a lower priority than the protocol stack associated with the first SIM, wherein the at least third RF resource is associated with one or more of the first and second SIM, and wherein the at least third RF resource is part of a common RF chain with one or more of the first and second RF resource.

28. The wireless communication device of claim 14, further comprising at least a third SIM.

29. A wireless communication device, comprising:

means for receiving, from a protocol stack associated with a first subscriber identification module (SIM) that is associated with a first radio frequency (RF) resource, a request to utilize a second RF resource for receive diversity, wherein the second RF resource is associated with a second SIM;

means for determining whether a protocol stack associated with the second SIM currently has a lower priority than the protocol stack associated with the first SIM; and means for granting control of the second RF resource to the protocol stack associated with the first SIM in response to determining that the protocol stack associated with the second SIM currently has a lower priority than the protocol stack associated with the first SIM;

wherein granting control provides to the protocol stack associated with the first SIM a capability to enable and disable receive diversity using the first and second RF resources, and wherein enabling receive diversity configures the first and second RF resources to receive, while the first SIM protocol stack is not in idle mode, a downlink signal associated with the first SIM by coupling a path for signals associated with the second RF resource to one or more components that process a first RF resource signal path associated with the first SIM.

30. A non-transitory processor-readable medium having stored thereon processor-executable instructions configured to cause a wireless communication device processor to perform operations comprising:

receiving, from a protocol stack associated with a first subscriber identification module (SIM) that is associated with a first radio frequency (RF) resource, a request to utilize a second RF resource for receive diversity, wherein the second RF resource is associated with a second SIM;

determining whether a protocol stack associated with the second SIM currently has a lower priority than the protocol stack associated with the first SIM; and granting control of the second RF resource to the protocol stack associated with the first SIM in response to determining that the protocol stack associated with the second SIM currently has a lower priority than the protocol stack associated with the first SIM, wherein granting control provides to the protocol stack associated with the first SIM a capability to enable and disable receive diversity using the first and second RF resources, and wherein enabling receive diversity configures the first and second RF resources to receive, while the first SIM protocol stack is not in idle mode, a downlink signal associated with the first SIM by coupling a path for signals associated with the second RF resource to one or more components that process a first RF resource signal path associated with the first SIM.

* * * * *